United States Patent
Hosokawa et al.

(10) Patent No.: US 12,553,952 B2
(45) Date of Patent: Feb. 17, 2026

(54) VOLTAGE MONITORING MODULE AND BATTERY UNIT

(71) Applicant: MEKTEC CORPORATION, Tokyo (JP)

(72) Inventors: Takuya Hosokawa, Tokyo (JP); Kenji Kiya, Tokyo (JP); Tomoki Kanayama, Tokyo (JP)

(73) Assignee: MEKTEC CORPORATION, Tokyo (JP)

(*) Notice: Subject to any disclaimer, the term of this patent is extended or adjusted under 35 U.S.C. 154(b) by 202 days.

(21) Appl. No.: 18/480,839

(22) Filed: Oct. 4, 2023

(65) Prior Publication Data

US 2024/0183909 A1   Jun. 6, 2024

(30) Foreign Application Priority Data

Dec. 2, 2022 (JP) .................................. 2022-193561

(51) Int. Cl.
*G01R 31/3835* (2019.01)
*G01R 31/396* (2019.01)

(52) U.S. Cl.
CPC ....... *G01R 31/3835* (2019.01); *G01R 31/396* (2019.01)

(58) Field of Classification Search
CPC .......................... G01R 31/3835; G01R 31/396
See application file for complete search history.

(56) References Cited

U.S. PATENT DOCUMENTS

| 2020/0020916 | A1* | 1/2020 | Takamatsu | H01M 50/507 |
| 2022/0077536 | A1* | 3/2022 | Yamada | H01M 50/505 |
| 2022/0173482 | A1* | 6/2022 | Lin | H01M 50/503 |
| 2022/0236332 | A1* | 7/2022 | Gyotoku | H05K 1/189 |
| 2022/0304158 | A1* | 9/2022 | Jung | H01M 50/516 |
| 2022/0360030 | A1* | 11/2022 | Matsunaga | H01M 10/4207 |
| 2023/0030091 | A1* | 2/2023 | Pan | H05K 1/028 |
| 2023/0125441 | A1* | 4/2023 | Kita | H01M 10/425 429/90 |

FOREIGN PATENT DOCUMENTS

| JP | 2020-013766 A | | 1/2020 |
| JP | 2020013653 A | * | 1/2020 |

* cited by examiner

*Primary Examiner* — Walter L Lindsay, Jr.
*Assistant Examiner* — Milton Gonzalez
(74) *Attorney, Agent, or Firm* — Studebaker Brackett PLLC

(57) ABSTRACT

A voltage monitoring module includes a flexible printed board including a plurality of wires, in which: the flexible printed board includes: a main body extending in a first direction; and a plurality of branch portions each branching off the main body, the plurality of branch portions being placed intermittently in the first direction, each of the branch portions includes, at a part on a distal end side thereof, a connection terminal to be connected to a cell terminal being a terminal of a battery cell of a battery pack having a plurality of the stacked battery cells, and among the plurality of branch portions, the branch portion located farther in the first direction from a reference position has a longer length dimension from a proximal end of the branch portion to the connection terminal.

15 Claims, 24 Drawing Sheets

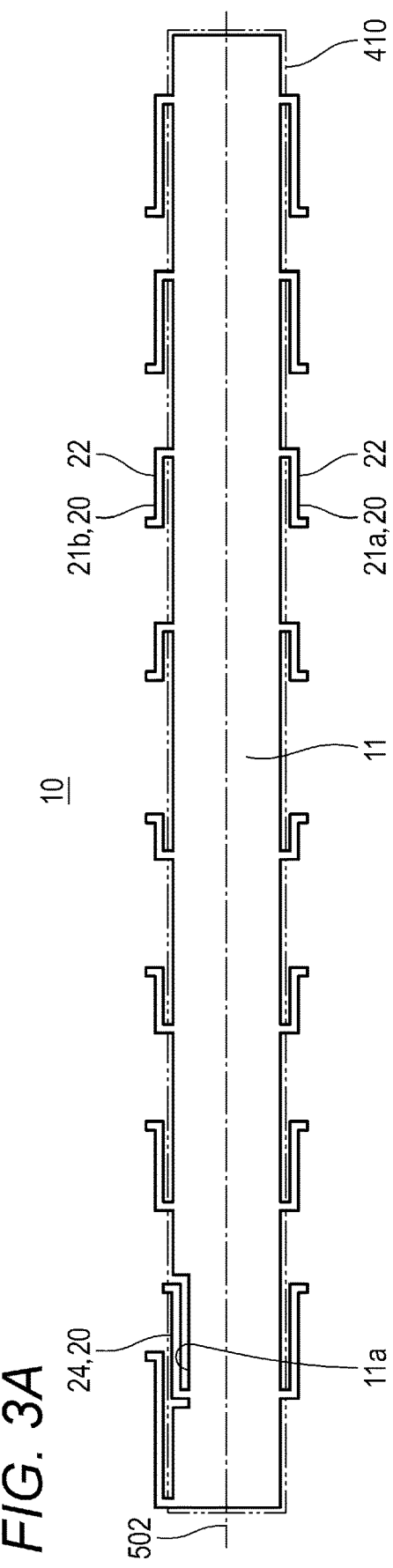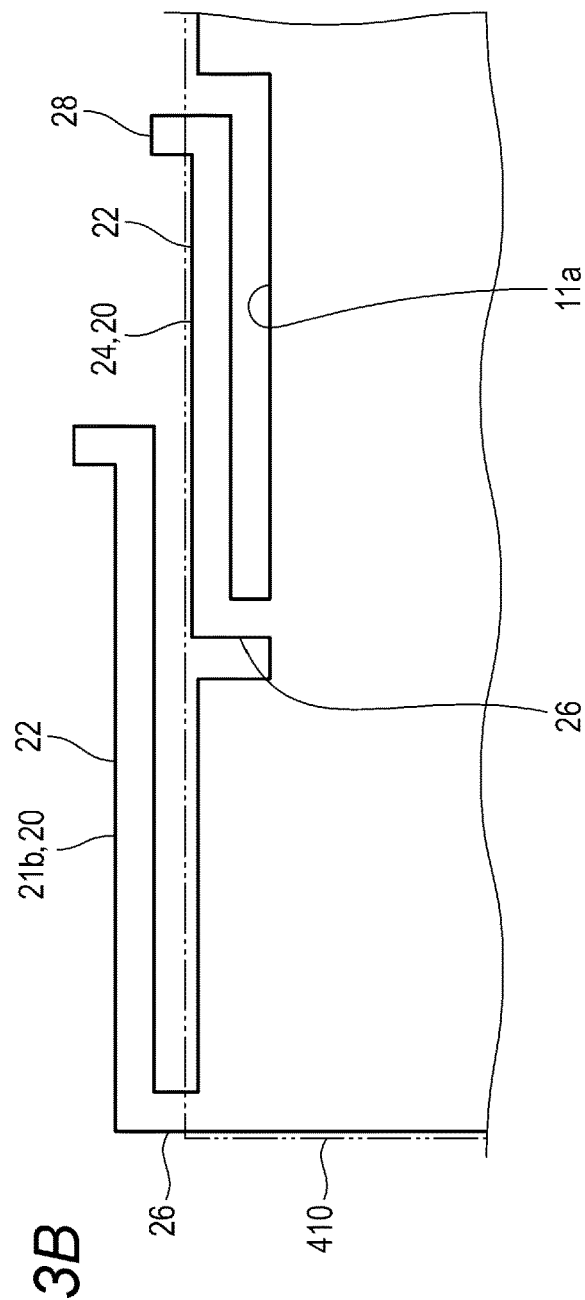
FIG. 3A
FIG. 3B

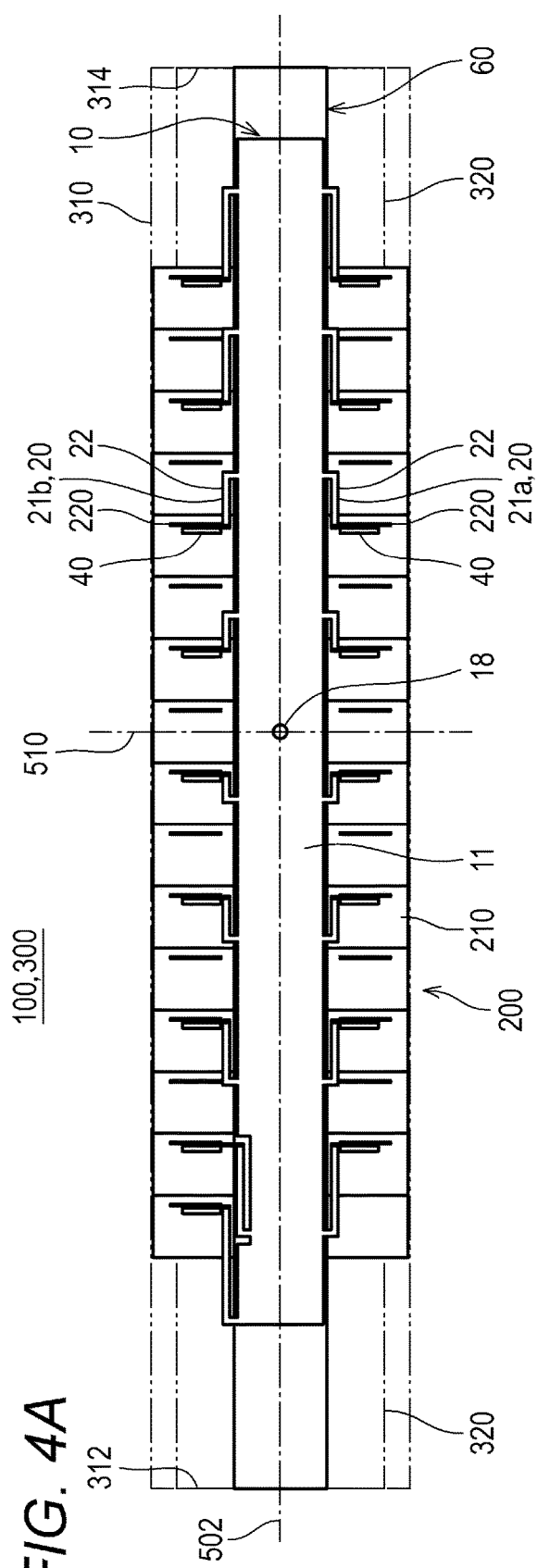
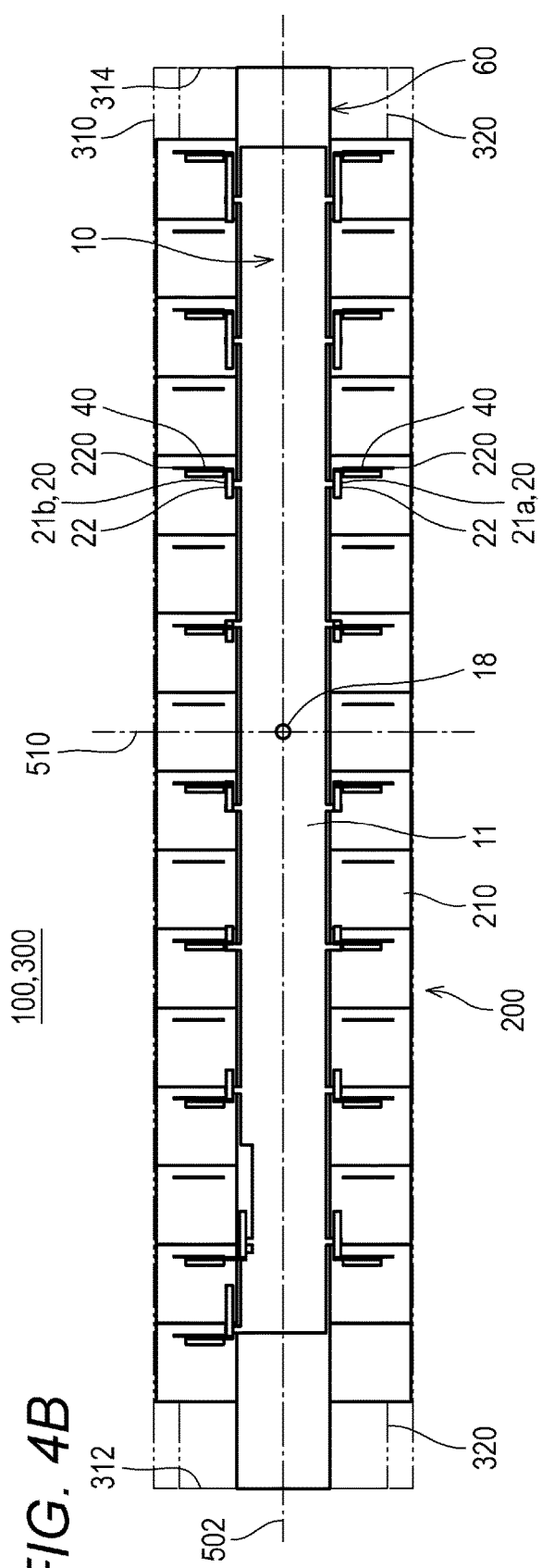
FIG. 4A
FIG. 4B

VOLTAGE MONITORING MODULE AND BATTERY UNIT

CROSS-REFERENCES

This application claims priority from Japanese Patent Application No. 2022-193561 filed with the Japan Patent Office on Dec. 2, 2022, the entire content of which is hereby incorporated by reference.

BACKGROUND

1. Technical Field

One aspect of the present disclosure relates to a voltage monitoring module and a battery unit.

2. Related Art

JP-A-2020-013766 describes a voltage monitoring module (written as a busbar module in JP-A-2020-013766) that monitors the state of voltage of a battery pack (written as a battery assembly in JP-A-2020-013766) including a plurality of stacked battery cells (written as cells in JP-A-2020-013766). The voltage monitoring module includes a flexible printed board (written as a flexible board in JP-A-2020-013766) having a plurality of wires. The flexible printed board includes a main body (written as a main line in JP-A-2020-013766) extending in a first direction and a plurality of branch portions (written as branch lines in JP-A-2020-013766) that each branches off the main body, and is placed intermittently in the first direction. A part on a distal end side of each of the branch portions has a connection terminal (written as a connection portion in JP-A-2020-013766) that is connected to a cell terminal being a terminal of the battery cell. The plurality of branch portions is equal in length dimension to each other.

SUMMARY

A voltage monitoring module includes a flexible printed board including a plurality of wires, in which: the flexible printed board includes: a main body extending in a first direction; and a plurality of branch portions each branching off the main body, the plurality of branch portions being placed intermittently in the first direction, each of the branch portions includes, at a part on a distal end side thereof, a connection terminal to be connected to a cell terminal being a terminal of a battery cell of a battery pack having a plurality of the stacked battery cells, and among the plurality of branch portions, the branch portion located farther in the first direction from a reference position has a longer length dimension from a proximal end of the branch portion to the connection terminal.

BRIEF DESCRIPTION OF DRAWINGS

FIG. 3A is a plan view of a flexible printed board in the first embodiment, and FIG. 3B is a partial enlarged plan view of an offset branch portion and a peripheral structure thereof in the first embodiment;

FIGS. 4A and 4B are plan views of the battery unit according to the first embodiment, of which FIG. 4A illustrates the state of a battery pack during discharge, and FIG. 4B illustrates the state of the battery pack during charge;

FIGS. 8A and 8B are partial enlarged views of a connection terminal and a peripheral structure thereof in the first embodiment, of which FIG. 8A is a perspective view, and FIG. 8B is a plan view;

FIGS. 12A and 12B are partial enlarged views of a holding portion and a peripheral structure thereof in a fifth embodiment, of which FIG. 12A is a plan view, and FIG. 12B is a cross-sectional view taken along line A-A illustrated in FIG. 12A;

FIGS. 13A and 13B are sectional end views taken along line A-A illustrated in FIG. 12A, of which FIG. 13A illustrates the state of a battery pack during discharge, and FIG. 13B illustrates the state of the battery pack during charge;

DETAILED DESCRIPTION

Figure 1:
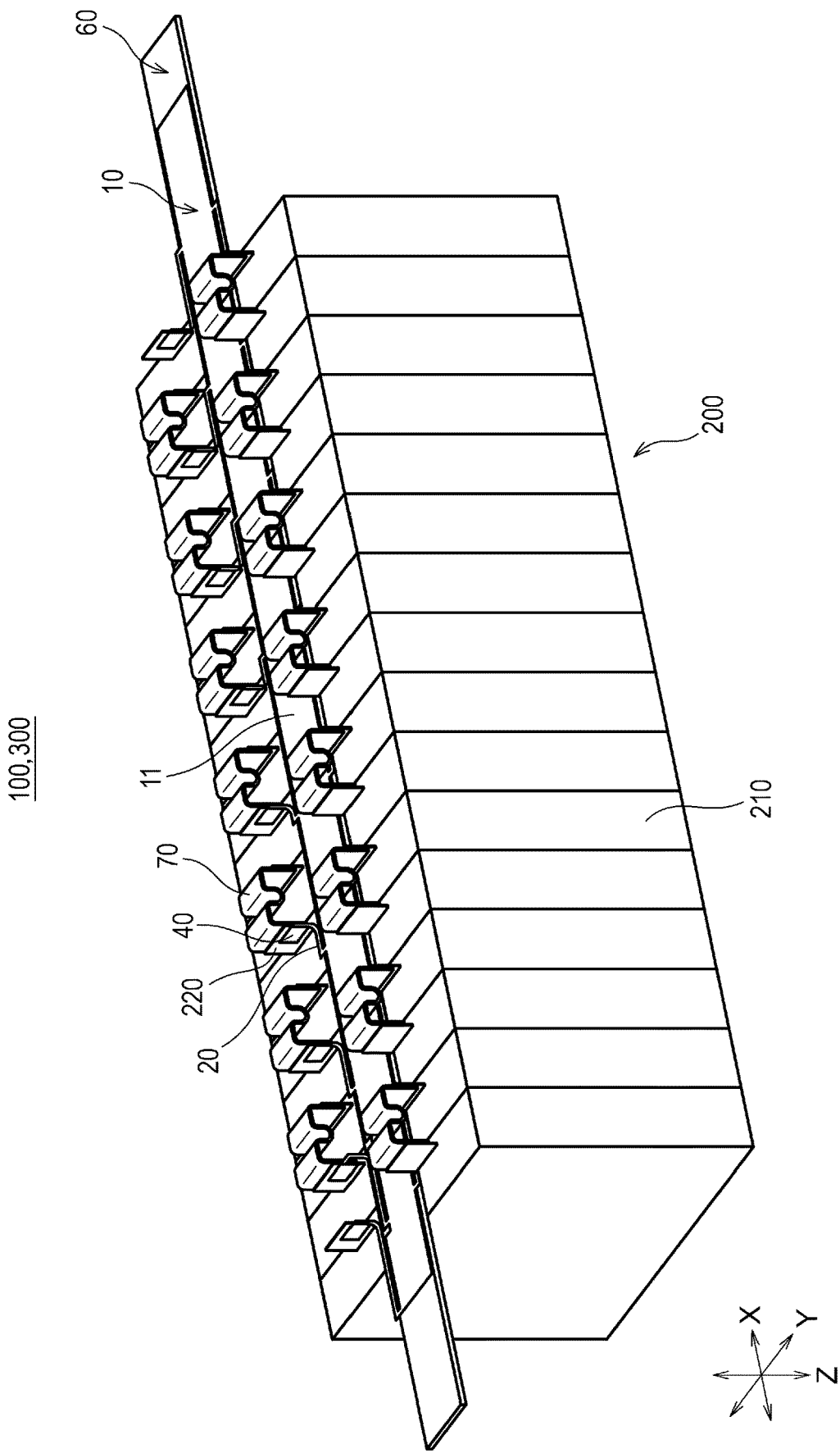
FIG. 1 is a perspective view of a battery unit according to a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a study conducted by the inventors of the present application, the technology of JP-A-2020-013766 has room for improvement from the viewpoint of enabling the connection terminal to excellently follow the movement of the cell terminal even when the cell terminal has a large amount of movement accompanied by the contraction or expansion of the battery pack.

One object of the present disclosure is to provide such a voltage monitoring module as follows: The voltage monitoring module has a structure that enables a connection terminal to excellently follow the movement of a cell terminal even when the cell terminal has a large amount of movement accompanied by the contraction or expansion of the battery cell.

A voltage monitoring module according to one aspect of the present disclosure (present voltage monitoring module) includes a flexible printed board including a plurality of wires, in which: the flexible printed board includes: a main body extending in a first direction; and a plurality of branch portions each branching off the main body, the plurality of branch portions being placed intermittently in the first direction, each of the branch portions includes, at a part on a distal end side thereof, a connection terminal to be connected to a cell terminal being a terminal of a battery cell of a battery pack having a plurality of the stacked battery cells, and among the plurality of branch portions, the branch portion located farther in the first direction from a reference position has a longer length dimension from a proximal end of the branch portion to the connection terminal.

A battery unit according to one aspect of the present disclosure includes: the present voltage monitoring module; and the battery pack, in which: each of the connection terminals of the flexible printed board is connected to the corresponding cell terminal of the battery pack.

According to the above aspects of the present disclosure, the connection terminal can excellently follow the movement of the cell terminal even when the cell terminal has a large amount of movement accompanied by the contraction or expansion of the battery cell.

Embodiments of the present disclosure are described hereinafter with reference to the drawings. Note that the same reference numerals are assigned to similar components in all the drawings and a description thereof is omitted as appropriate.

First Embodiment

First, a first embodiment is described with reference to FIGS. 1 to 8B.

As illustrated in any of FIGS. 1 to 8B, a voltage monitoring module 100 according to the embodiment is a voltage monitoring module that monitors the state of voltage of a battery pack 200 including a plurality of stacked battery cells 210. The voltage monitoring module 100 includes a flexible printed board 10 having a plurality of wires 51.

The flexible printed board 10 includes a main body 11 that extends in a first direction (an X direction illustrated in, for example, FIG. 1 in a case of the embodiment), and a plurality of branch portions 20 that each branches off the main body 11, and is placed intermittently in the first direction.

A part on a distal end side of each of the branch portions 20 has a connection terminal 55 (refer to FIG. 8A) that is connected to a cell terminal 220 being a terminal of the battery cell 210.

Among the plurality of branch portions 20, the branch portion 20 located farther in the first direction from a reference position 510 (refer to FIG. 2) has a longer length dimension from its proximal end to the connection terminal 55.

Note that the first direction mentioned here is a longitudinal direction of the main body 11.

Moreover, in the embodiment, a relationship that, among at least two branch portions 20 of the plurality of branch portions 20, the branch portion 20 located farther in the first direction from the reference position has a longer length dimension from its proximal end to the connection terminal 55 is simply required to be established. As described below, it is preferable that the farther the branch portion 20 is located in the first direction from the reference position, the longer length dimension from the proximal end to the connection terminal 55 the branch portion 20 has.

The voltage monitoring module 100 is mounted on the battery pack 200 in such a manner that the longitudinal direction of the main body 11 (that is, the first direction) is aligned with the stacking direction of the battery cells 210. Each of the connection terminals 55 is connected to its corresponding cell terminal 220.

In the case of the embodiment, the central position of the battery pack 200 in the stacking direction (the first direction) in a state where the voltage monitoring module 100 is mounted on the battery pack 200 is the reference position 510.

As illustrated in FIG. 4A, during discharge of the battery pack 200, each of the plurality of battery cells 210 contracts inward relative to the reference position 510 (the central position of the battery pack 200). The cell terminals 220 move in a direction closer to the reference position 510 in the first direction accompanied by the contraction of the plurality of battery cells 210. Moreover, the connection terminals 55 that are connected to the cell terminals 220 also move in the direction closer to the reference position 510, following the cell terminals 220. The movable range of the each of the connection terminals 55 at this point in time is determined in accordance with the length dimension of the branch portion 20 having the connection terminal 55. In more detail, the longer the branch portion 20 is in length dimension, the wider movable range the connection terminal 55 has. Moreover, the cell terminals 220 located farther in the first direction from the reference position 510 among a plurality of the cell terminals 220, and the connection terminals 55 connected to the aforementioned cell terminals 220 have a larger amount of movement in the first direction.

Moreover, during charge of the battery pack 200, the each of the plurality of battery cells 210 expands outward relative to the reference position 510 (the central position of the battery pack 200). The cell terminals 220 move in a direction away from the reference position 510 in the first direction, accompanied by the expansion of the plurality of battery cells 210. Moreover, the connection terminals 55 connected to the cell terminals 220 move in the direction away from the reference position 510, following the cell terminals 220. The movable range of the each of the connection terminals 55 at this point in time is determined in accordance with the length dimension of the branch portion 20 having the connection terminal 55. In more detail, the longer the branch portion 20 is in length dimension, the wider movable range the connection terminal 55 has. Moreover, the cell terminals 220 located farther in the first direction from the reference position 510 among the plurality of the cell terminals 220, and the connection terminals 55 connected to their corresponding cell terminals 220 have a larger amount of movement in the first direction.

According to the embodiment, among the plurality of branch portions 20, the branch portion 20 located farther in the first direction from the reference position 510 has a longer length dimension from its proximal end to the connection terminal 55.

Consequently, it is possible to secure a wider movable range in the direction closer to the reference position 510 and a wider movable range in the direction away from the reference position 510, the movable ranges being related to the connection terminals 55 connected to the cell terminals 220 located farther in the first direction from the reference position 510 among the plurality of the cell terminals 220. Hence, even when the connection terminal 55 that is located far from the reference position 510 and connected to the cell terminal 220 having a large amount of movement can excellently follow the movement of the cell terminal 220.

In this manner, according to the embodiment, even when the cell terminal 220 has a large amount of movement accompanied by the contraction or expansion of the battery cell 210, the connection terminal 55 can excellently follow the movement of the cell terminal 220.

Moreover, a battery unit 300 according to the embodiment includes the voltage monitoring module 100 and the battery pack 200 of the embodiment.

The each of the connection terminals 55 of the flexible printed board 10 is connected to its corresponding cell terminal 220 of the battery pack 200.

According to the embodiment, as described above, among the plurality of branch portions 20 provided in the voltage monitoring module 100, the branch portion 20 located farther in the first direction from the reference position 510 has a longer length dimension from its proximal end to the connection terminal 55.

Hence, even when the cell terminal 220 has a large amount of movement accompanied by the contraction or expansion of the battery cell 210, the connection terminal 55 can excellently follow the movement of the cell terminal 220.

When, for example, the positional relationships of the components of the voltage monitoring module 100 and the battery unit 300 are described below, one side in the first direction is referred to as right (rightward), and the other side is referred to as left (leftward). Moreover, one side in a second direction (a Y direction illustrated in, for example, FIGS. 1 and 2) orthogonal to both of the normal direction of main body 11 and the first direction is referred to as front (forward), and the other side is referred to as back (backward). Moreover, a direction orthogonal to both of the first and second directions is referred to as the up-and-down direction, one side in the up-and-down direction is referred to as up (upward), and the other side is referred to as down (downward). Moreover, an orientation (direction) orthogonal to the up-and-down direction is referred to as horizontal (a horizontal direction), and an orientation (direction) along the up-and-down direction is referred to as vertical (a vertical direction).

Furthermore, in the first direction, a side closer to the central position of the battery pack 200 in the stacking direction may be referred to as inward (the inner side), and a side opposite to inward may be referred to as outward (the outer side). Similarly, in the second direction, a side closer to the central position of the battery pack 200 in a direction orthogonal to both of the normal direction of the main body 11 and the stacking direction may be referred to as inward (the inner side), and a side opposite to inward may be referred to as outward (the outer ward).

Moreover, unless otherwise stated, the positional relationship and shape of each portion of the voltage monitoring module 100 and the battery unit 300 are a positional relationship and shape during the discharge of the battery pack 200.

For example, a connector is mounted on the flexible printed board 10. The flexible printed board 10 is connected to a measuring apparatus that performs various types of control, via the connector, and can monitor the state of voltage of the battery pack 200.

When the flexible printed board 10 is used to monitor voltage, the wires 51 of the flexible printed board 10 are attached to, for example, busbars 70 (the details are described below) that connect the plurality of battery cells 210.

As illustrated in FIGS. 1 to 3A, the shape of the main body 11 of the flexible printed board 10 is not particularly limited. The main body 11 of the flexible printed board 10 is formed in, for example, an approximately rectangular shape that is extra long in the first direction in plan view.

Figure 2:
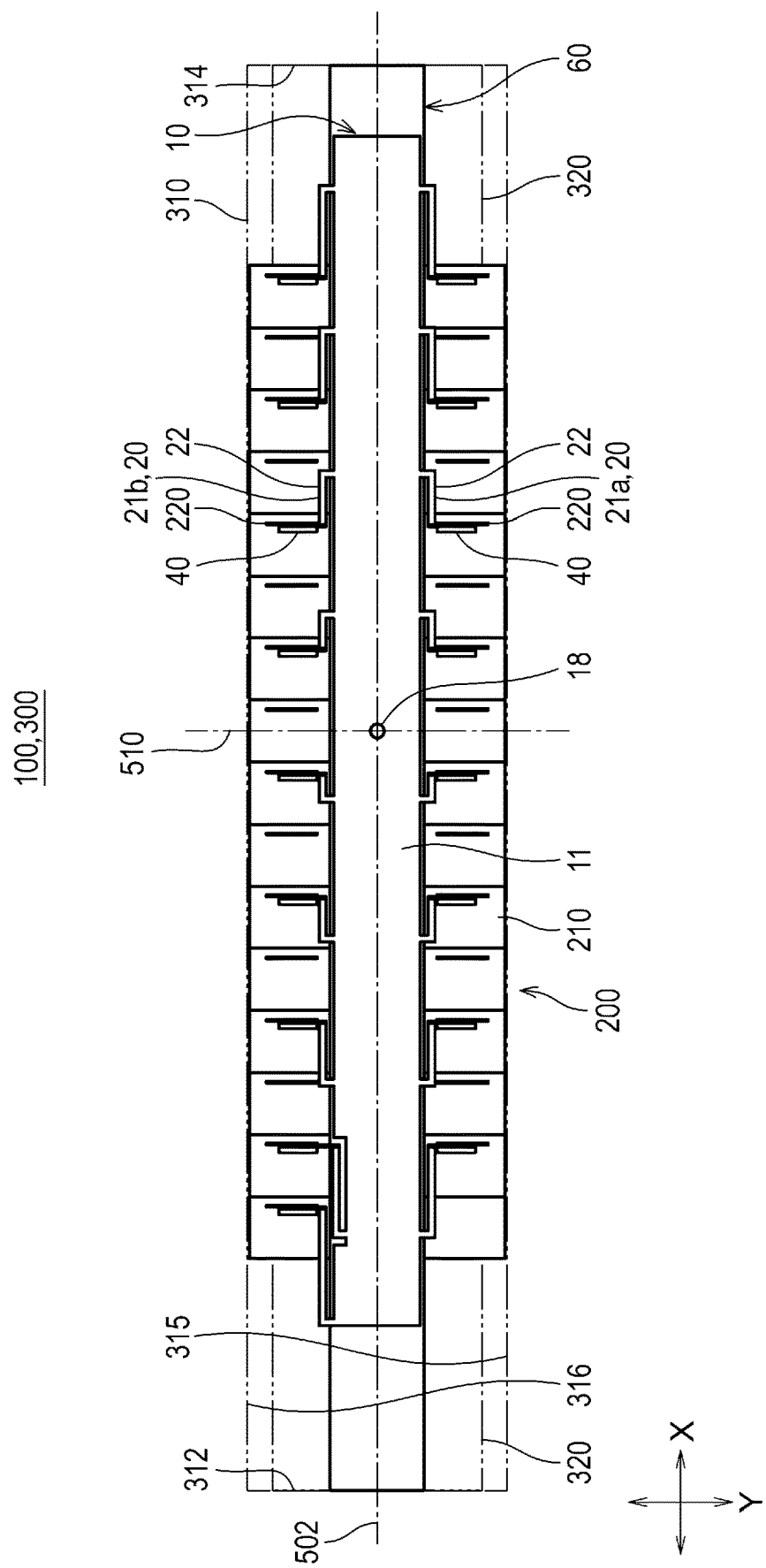
FIG. 2 is a plan view of the battery unit according to the first embodiment.

As illustrated in FIGS. 2 and 3A, the each of the branch portions 20 includes, for example, a first-direction extension portion 22 that extends in the first direction.

Among the plurality of branch portions 20, the branch portion 20 located farther in the first direction from the reference position 510 has a longer length dimension of the first direction extension portion 22.

Consequently, it is possible to secure a sufficient movable range in the direction closer to the reference position 510 and a sufficient movable range in the direction away from the reference position 510, the movable ranges being related to the connection terminals 55 connected to the cell terminals 220 located farther in the first direction from the reference position 510 among the plurality of the cell terminals 220. Hence, even when the cell terminal 220 has a large amount of movement accompanied by the contraction or expansion of the battery cell 210, the connection terminal 55 can excellently follow the movement of the cell terminal 220.

Figure 8A:
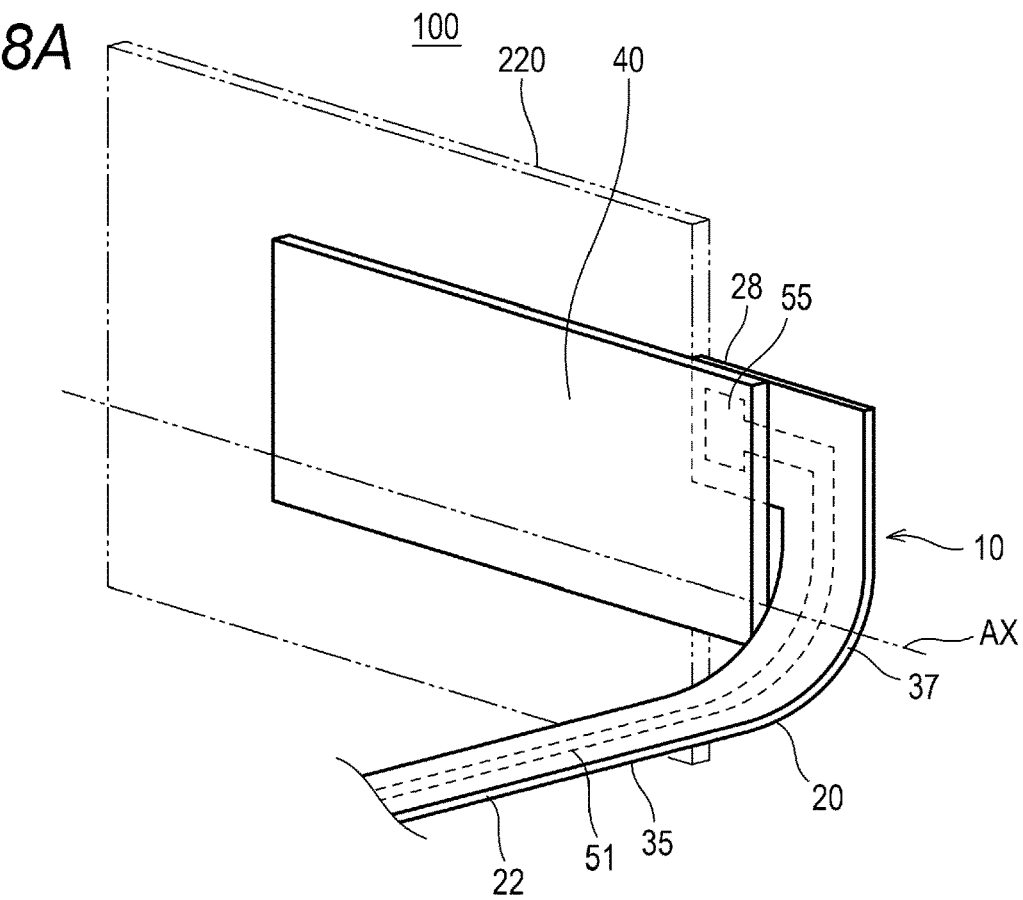

In more detail, the each of the branch portions 20 includes a protruding portion 26 (refer to FIG. 3B) that protrudes from the main body 11 in the second direction (the Y direction illustrated in, for example, FIG. 2) orthogonal to both of the normal direction of the main body 11 and the first direction (the X direction), the first-direction extension portion 22 that extends in the first direction from a distal end portion of the protruding portion 26, and a distal end protruding portion 28 that protrudes in the second direction from a distal end portion (an end portion opposite to the protruding portion 26) of the first-direction extension portion 22. As illustrated in FIG. 8A, the distal end protruding portion 28 includes the connection terminal 55. Note that in the diagrams other than FIG. 8A, the illustration of the connection terminal 55 is omitted as appropriate.

The first-direction extension portion 22, the protruding portion 26, and the distal end protruding portion 28 extend linearly in plan view.

Figure 6:
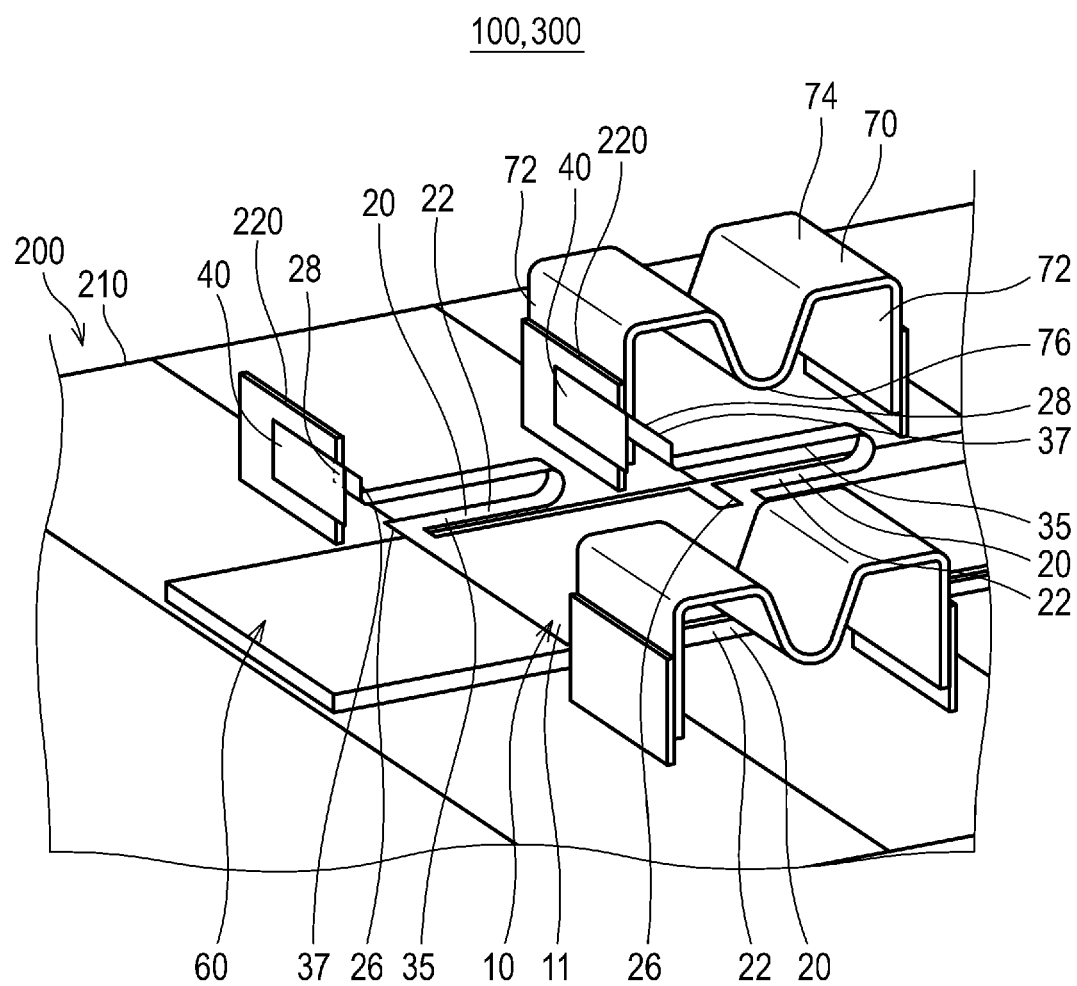
FIG. 6 is a partial enlarged perspective view of the battery unit according to the first embodiment, and illustrates the state of the battery pack during charge.

In the case of the embodiment, as illustrated in FIG. 4B or 6, when the each of the connection terminals 55 moves in the direction away from the reference position 510 in the first direction, following the cell terminal 220 corresponding to the connection terminal 55, during the charge of the battery pack 200, the distal end protruding portion 28 of the branch portion 20 is also pulled by the cell terminal 220 and moves in the direction away from the reference position 510. At this point in time, the distal end protruding portion 28 can move outward of the protruding portion 26 in the first direction. Hence, the distal end protruding portion 28, and by extension the connection terminal 55, can move in the direction away from the reference position 510 within a wider range than the length dimension of the first-direction extension portion 22. In the case of the embodiment, as an example, the movable range of the connection terminal 55 is equal to or greater than once and less than twice the length dimension of the first-direction extension portion 22. Note that when the distal end protruding portion 28, and by extension the connection terminal 55, moves, the distal end protruding portion 28 and the connection terminal 55 maintain the constant height position, and move horizontally. Moreover, as illustrated in FIG. 6, a portion of the first-direction extension portion 22 deforms into a shape that curves from the inner side to the outer side in the first direction and is folded back. In more detail, flat surfaces of the portion of the first-direction extension portion 22 turns into a state of facing each other in the up-and-down direction. As the distal end protruding portion 28 moves in the direction away from the reference position 510, the starting point of folding back the first-direction extension portion 22 also moves in the same direction. At this point in time, the dimension of a portion located on the lower side of the first-direction extension portion 22 reduces gradually, and the dimension of a portion located on the upper side increases gradually.

Figure 5:
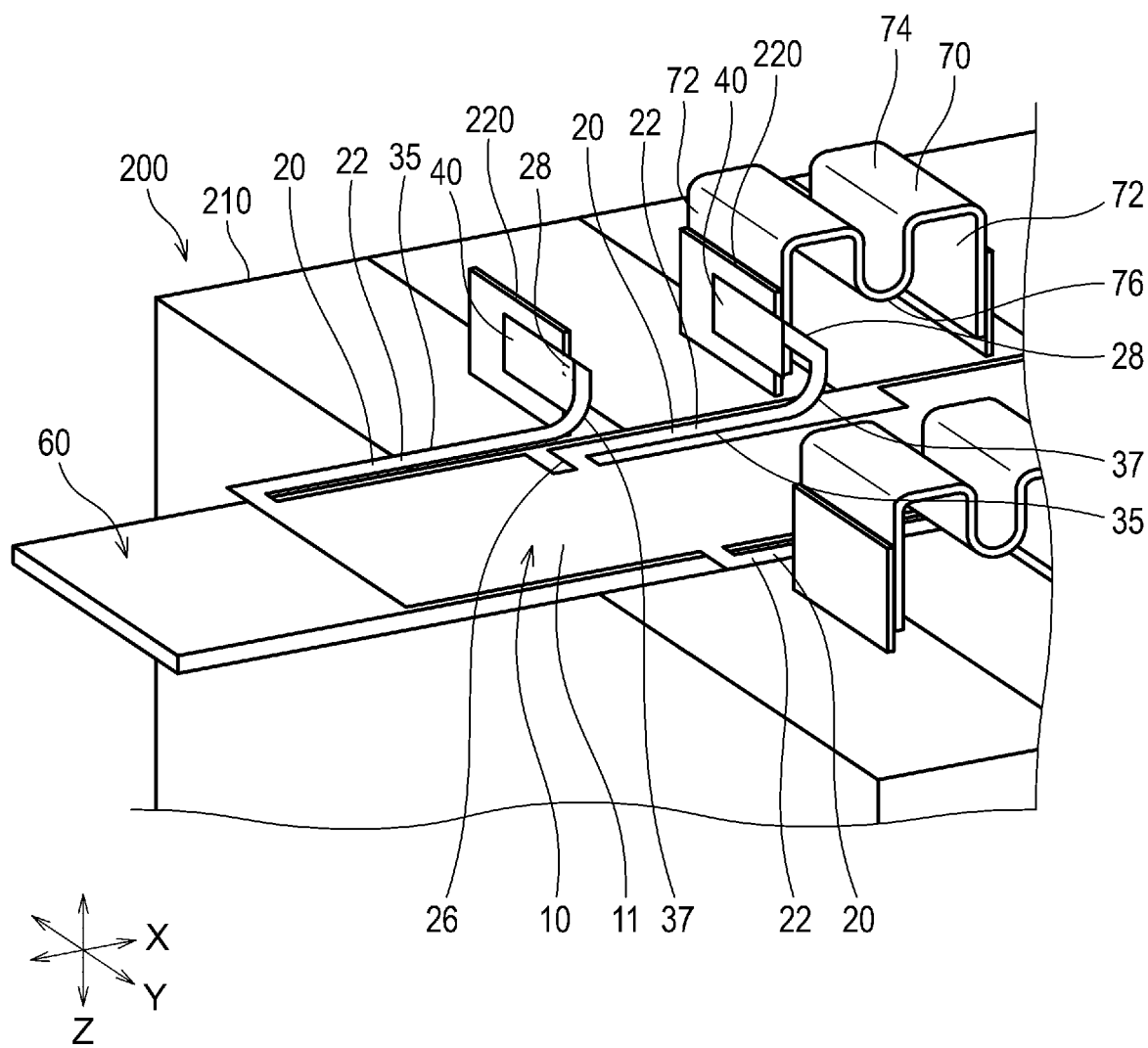
FIG. 5 is a partial enlarged perspective view of the battery unit according to the first embodiment, and illustrates the state of the battery pack during discharge.

Moreover, as illustrated in FIGS. 4A and 5, when the each of the connection terminals 55 moves inward in the first direction, following its corresponding cell terminal 220 during the discharge of the battery pack 200, the distal end protruding portion 28 of the branch portion 20 is also pulled by the cell terminal 220, and moves in the direction closer to the reference position 510. At this point in time, the distal end protruding portion 28 can move inward of the protruding portion 26 in the first direction. Hence, the distal end protruding portion 28, and by extension the connection terminal 55, can move in the direction closer to the reference position 510 within a wider range than the length dimension of the first-direction extension portion 22. In the case of the embodiment, as an example, the movable range of the connection terminal 55 is equal to or greater than once and less than twice the length dimension of the first-direction extension portion 22. Note that when the distal end protruding portion 28, and by extension the connection terminal 55, moves, the distal end protruding portion 28 and the connection terminal 55 maintain the constant height position, and move horizontally. As the distal end protruding portion 28 moves in the direction closer to the reference position 510, the starting point of folding back the first-direction extension portion 22 also moves in the same direction. At this point in time, the dimension of the portion located on the lower side of the first-direction extension portion 22 increases gradually, and the dimension of the portion located on the upper side reduces gradually. Hence, as illustrated in FIG. 5, a portion of the first-direction extension portion 22 deforms (returns) from the folded-back state (refer to FIG. 6) into a shape that extends substantially even.

Moreover, the branch portion 20 is configured, including a first portion 35 that is bent around an axis AX (refer to FIG. 8A) intersecting both of the normal direction of the main body 11 and the first direction, and extends in the first direction, and a second portion 37 that has the connection terminal 55 and stands from the first portion 35. Note that in FIG. 8A, the axis AX is illustrated by a chain double-dashed line. Moreover, in the case of the embodiment, the axis AX is orthogonal to both of the normal direction of the main body 11 (the up-and-down direction) and the first direction, and the axial direction of the axis AX is the second direction. However, in the embodiment, the axis AX is required to at least intersect both of the normal direction of the main body 11 and the first direction, and the axis AX does not have to be orthogonal to both of the normal direction of the main body 11 and the first direction.

Consequently, in this configuration, a portion (the second portion 37) of the branch portion 20 is caused in advance to stand, and the standing portion has the connection terminal 55. Hence, during the charge of the battery pack 200, the first-direction extension portion 22 can deform smoothly into a shape that is folded back from the inner side to the outer side in the first direction. In other words, the connection terminal 55 can move smoothly in the direction away from the reference position 510, following the movement of the cell terminal 220.

In more detail, in the case of the embodiment, the distal end portion of the first-direction extension portion 22 and the distal end protruding portion 28 form the second portion 37, and a part, which excludes the second portion 37, of the distal end portion of the first-direction extension portion 22 forms the first portion 35.

Figure 7:
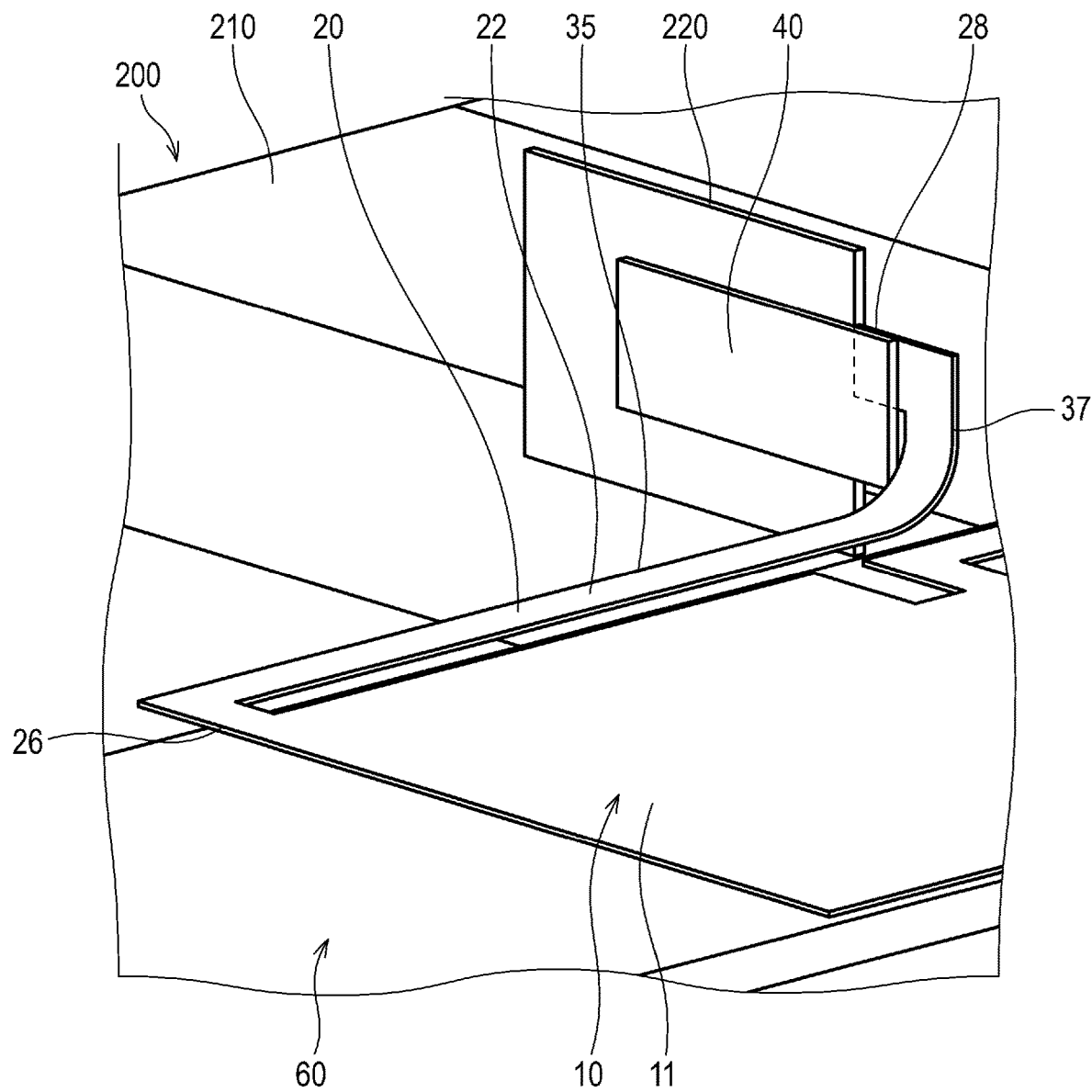
FIG. 7 is a partial enlarged perspective view of a branch portion and a peripheral structure thereof in the first embodiment.

As illustrated in FIGS. 5 and 7, for example, the first portion 35 extends substantially horizontally and is placed flush with the main body 11. The second portion 37 is bent upward from a distal end of the first portion 35 with an approximately 90-degree curve around the axis AX. Surfaces of a distal end portion of the second portion 37 are placed, facing in the first direction. As illustrated in FIGS. 5 and 6, also when the connection terminal 55 moves outward in the first direction, following the cell terminal 220, the distal end portion of the second portion 37 is maintained with the surfaces thereof facing in the first direction.

In the case of the embodiment, the each of the plurality of branch portions 20 includes the protruding portion 26, the first-direction extension portion 22, and the distal end protruding portion 28. The farther the branch portion 20 is located in the first direction from the reference position 510, the longer length dimension the first-direction extension portion 22 has. Note that as illustrated in FIGS. 2 and 3A, the first-direction extension portions 22 of the branch portions 20 placed at the same position in the first direction are equal in length dimension.

Moreover, the each of the plurality of branch portions 20 is configured, including the first portion 35 and the second portion 37. The first portion 35 is bent around the axis AX intersecting both of the normal direction of the main body 11 and the first direction, and extends in the first direction. The second portion 37 has the connection terminal 55 and stands from the first portion 35.

Moreover, the plurality of branch portions 20 includes an offset branch portion 24 (refer to FIG. 3B) that is offset to another branch portion 20 in the second direction (the Y direction) that is orthogonal to both of the normal direction of the main body 11 (a Z direction illustrated in FIG. 1 in the case of the embodiment) and the first direction (the X direction). The offset branch portion 24 and the another branch portion 20 overlap partly as viewed in the second direction.

According to such a configuration, it is possible to prevent the connection terminal 55 of the offset branch portion 24 and the connection terminal 55 of the another branch portion 20 from interfering with each other when they move, following the cell terminals 220, even when the movable range of the connection terminal 55 of the offset branch portion 24 overlaps the movable range of the connection terminal 55 of the another branch portion 20 in the first direction.

A portion of a part (the offset branch portions 24 in the case of the embodiment) of the plurality of branch portions 20 stays within a rectangle 410 (refer to FIGS. 3A and 3B) that circumscribes the main body 11 in plan view. Note that in FIGS. 3A and 3B, the rectangle 410 is indicated by a chain double-dashed line.

Consequently, it is possible to more reliably prevent the connection terminal 55 of the offset branch portion 20 and the connection terminal 55 of the another branch portion 20 from interfering with each other.

In more detail, in the case of the embodiment, a slit 11a that is recessed forward is formed in a back edge portion of the main body 11. The protruding portion 26 and the first-direction extension portion 22 of the part (the offset branch portions 24) of the branch portions 20 are placed inside the slit 11a in plan view. On the other hand, a distal end portion of the distal end protruding portion 28 of the part (the offset branch portions 24) of the branch portions 20 protrudes outward of the slit 11a in plan view.

Note that in FIGS. 3A and 3B, each side of the rectangle 410 is illustrated, displaced slightly outward of its corresponding side of the main body 11 to illustrate the shape of the rectangle 410 in an easy-to-understand manner for the sake of convenience.

As illustrated in FIGS. 2 and 3A, for example, the plurality of branch portions 20 (excluding the offset branch portion 24 and the branch portion 20 overlapping the offset branch portion 24 in the second direction) are symmetrically placed front and back with respect to a virtual line 502 that passes through the center of the main body 11 and extends in the second direction, and formed into a front and back symmetrical shape.

The first-direction extension portion 22 of each of a plurality of branch portions 20 located on the left side of the reference position 510 among the plurality of branch portions 20 extends from the left to the right with the protruding portion 26 corresponding to the first-direction extension portion 22 as a starting point. The first-direction extension portion 22 of each of a plurality of branch portions 20 located on the right side extends from the right to the left with the protruding portion 26 corresponding to the first-direction extension portion 22 as a starting point. In other words, the first-direction extension portion 22 of the each of the plurality of branch portions 20 located on the opposite directions relative to the reference position 510 extends in the opposite direction with the protruding portion 26 corresponding to the first-direction extension portion 22 as the starting point.

Moreover, as illustrated in FIGS. 2 and 3A, the plurality of branch portions 20 includes, for example, a plurality of first branch portions 21a that each branches off a front edge of the main body 11 and a plurality of second branch portions 21b that each branches off a back edge of the main body 11.

In the case of the embodiment, among the plurality of second branch portions 21b, the second branch portion 21b located second to the left is the offset branch portion 24. In more detail, the first-direction extension portion 22 and the distal end protruding portion 28 of the second branch portion 21b on the left side of the offset branch portion 24 overlap the first-direction extension portion 22 and the protruding portion 26 of the offset branch portion 24 in the second direction.

Each of the protruding portions 26 of the plurality of first branch portions 21a extends forward from the front edge of the main body 11. Each of the protruding portions 26 of the plurality of second branch portions 21b extends backward from the back edge of the main body 11.

Each of the distal end protruding portions 28 of the plurality of first branch portions 21a extends forward from the distal end portion of its corresponding first-direction extension portion 22. Each of the distal end protruding portions 28 of the plurality of second branch portions 21b extends backward from the distal end portion of its corresponding first-direction extension portion 22.

Note that in the embodiment, the plurality of branch portions 20 is not necessarily formed on the two edges (the front and back edges in the case of the embodiment) of the main body 11. For example, the plurality of branch portions 20 may selectively branch from one (the front or back edge in the case of the embodiment) of the edges of the main body 11.

As illustrated in FIG. 8A, the plurality of wires 51 extends all the way from the inside of the main body 11 to the distal end protruding portions 28 of the branch portions 20, respectively. For example, one wire 51 is placed for the each of the branch portions 20. One connection terminal 55 is formed at each of the distal end protruding portions 28. A distal end of each of the wires 51 is connected to its corresponding connection terminal 55. For example, the connection terminals 55 are exposed to the surfaces of the distal end protruding portions 28.

As illustrated in FIG. 1, the voltage monitoring module 100 includes, for example, the flexible printed board 10 and a plurality of the busbars 70. The busbars 70 connect the plurality of battery cells 210 in series. However, in the embodiment, for example, the busbars 70 may connect part of the plurality of battery cells 210 in parallel.

The busbars 70 are placed on top of the cell terminals 220, and connected (for example, laser-welded) to the cell terminals 220. Note that the illustration of the busbars 70 is omitted in FIGS. 2 and 4A and 4B.

Each of the busbars 70 is formed by bending a flat-shaped metal member a plurality of times. The shape of the busbars 70 is not particularly limited. As an example, the busbars 70 are formed in an approximately M shape in front view.

In more detail, the each of the busbars 70 includes a pair of left and right outer leg portions 72, and a main portion 74 placed astride the pair of left and right outer leg portions 72.

The pair of left and right outer leg portions 72 stands vertically, and surfaces of each of the pair face in the first direction. As illustrated in FIGS. 5 and 6, each of the outer leg portions 72 is placed on top of the cell terminal 220, and connected (for example, laser-welded) to the cell terminal 220. In more detail, the left outer leg portion 72 is connected to the cell terminal 220 of the left battery cell 210 of two battery cells 210 placed adjacent to each other in the first direction, and the right outer leg portion 72 is connected to the cell terminal 220 of the right battery cell 210.

The main portion 74 is formed in, for example, an approximately rectangular shape that is extra long in the first direction in plan view. A left end portion of the main portion 74 is connected to an upper end of the left outer leg portion 72. A right end portion of the main portion 74 is connected to an upper end of the right outer leg portion 72. The two end portions of the main portion 74 are placed horizontally.

On the other hand, a middle portion (a portion excluding the two end portions) of the main portion 74 is formed as, for example, a curved portion 76 that is bowed downward.

The curved portion 74 is curved in, for example, an approximately U shape in front view, and is open upward.

As illustrated in FIGS. 1 and 2, the voltage monitoring module 100 further includes a rigid plate-shaped member 60 on which the main body 11 is mounted.

The plate-shaped member 60 is placed horizontally. Surfaces thereof are formed even. The main body 11 is stacked on a top surface of the plate-shaped member 60.

The shape of the plate-shaped member 60 is not particularly limited. As an example, the plate-shaped member 60 is formed in an approximately rectangular shape that is extra long in the first direction as illustrated in FIG. 2.

As illustrated in FIG. 2, the length dimension of the plate-shaped member 60 is, for example, greater than the length dimension of the main body 11. Moreover, the width dimension (the dimension in the second direction) of the plate-shaped member 60 is, for example, slightly greater than the width dimension (the dimension in the second direction) of the main body 11. The entire main body 11 stays within a visible outline of the plate-shaped member 60 in plan view.

On the other hand, a portion of the each of the branch portions 20 and the each of the connection terminals 55 jut outward of the visible outline of the plate-shaped member 60.

The entire plate-shaped member 60 is integrally molded with a hard resin material as an example.

In the case of the embodiment, the main body 11 is fixed by heat staking to the plate-shaped member 60 as an example. In more detail, as illustrated in FIG. 2, a heat staked portion 18 is formed in a central portion of the main body 11 as an example. The heat staked portion 18 fixes the main body 11 to the plate-shaped member 60. In more detail, a projection (not illustrated) is formed on the top surface of the plate-shaped member 60. A through-hole (not illustrated) is formed in a part, which corresponds to the projection, of the main body 11. A distal end portion of the projection is pressed down by heat staking in a state where the projection of the plate-shaped member 60 has been inserted in the through-hole of the main body 11 to increase the outer diameter of the distal end portion of the projection as compared to the inner diameter of the through-hole. Consequently, the heat staked portion 18 is formed to prevent the projection of the plate-shaped member 60 from coming out of the main body 11.

Note that in the embodiment, that "the main body 11 is fixed to the plate-shaped member 60" indicates at least a state of preventing vibrations from the main body 11 to the plate-shaped member 60. The main body 11 is not necessarily fixed to the plate-shaped member 60 by bonding, joining, or direct pressing.

Moreover, in an aspect of the present disclosure, the method for fixing the main body 11 to the plate-shaped member 60 is not limited to this example (the details are described below).

Moreover, the example where the heat staked portion 18 is formed in one place is illustrated in, for example, FIG. 2. In terms of this, in the aspect of the present disclosure, the number of the heat staked portions 18 is not limited. For example, the heat staked portions 18 may be formed in a plurality of places in the first direction.

In the case of the embodiment, the battery unit 300 includes, for example, a housing 310 that houses the battery pack 200, and buffer materials 320 that bias the plurality of battery cells 210 toward the reference position 510 as illustrated in FIG. 2. Note that in FIGS. 2 and 4A and 4B, the housing 310 and the buffer materials 320 are illustrated by chain double-dashed lines.

The housing 310 is formed in, for example, a box shape that is open upward. The housing 310 includes a pair of left and right side wall portions 312 and 314, a front wall portion 315, a back wall portion 316, and a bottom portion. The shape of the housing 310 is not particularly limited. As an example, the housing 310 is formed in an approximately rectangular shape that is extra long in the first direction in plan view.

As illustrated in FIG. 2, the entire battery pack 200 is housed in the housing 310. Note that in the example illustrated in, for example, FIG. 2, surfaces of adjacent battery cells 210 are in surface contact with each other. However, the embodiment is not limited to this example. For example, an unillustrated spacer may be placed between the adjacent battery cells 210. In this case, the spacer is preferably stretchable in the first direction accompanied by the expansion and contraction of the battery cells 210.

Note that in the embodiment, the battery unit 300 may include a thermistor (not illustrated) for detecting the temperature of the battery pack 200, and a wiring (not illustrated) that connects the thermistor and a measuring apparatus that performs various types of control.

A gap is formed between the left side wall portion 312 of the housing 310 and the battery cell 210 placed at the left end. The buffer material 320 is placed in the gap. Similarly, a gap is formed between the right side wall portion 314 of the housing 310 and the battery cell 210 placed at the right end. The buffer material 320 is placed in the gap.

The left buffer material 320 biases the plurality of battery cells 210 to the right. The right buffer material 320 biases the plurality of battery cells 210 to the left. In other words, the battery pack 200 is biased inward from the left and right sides by a pair of the left and right buffer materials 320. As illustrated in FIGS. 4A and 4B, the pair of the left and right buffer materials 320 is stretchable in the first direction accompanied by the expansion and contraction of the battery cells 210. In more detail, during the charge of the battery pack 200, the buffer materials 320 are pressed by the battery cells 210 and compressed in the first direction against elastic restoring forces thereof. On the other hand, during the discharge of the battery pack 200, the buffer materials 320 elastically recover and stretch in the first direction. Hence, even when the battery cells 210 expand and contract repeatedly, the pair of the left and right buffer materials 320 can prevent the central position of the battery pack 200 (the reference position 510) from being displaced relative to the housing 310.

In the case of the embodiment, as described above, the central position of the battery pack 200 in the first direction is the reference position 510. The each of the plurality of battery cells 210 expands outward or contracts inward relative to the reference position 510 (the central position of the battery pack 200). Moreover, the center of the main body 11 is placed at the same position as the center of the battery pack 200 (that is, the reference position 510) in the first direction.

The buffer materials 320 are not particularly limited, but in the case of the embodiment, cushioning members can be used as an example.

However, in the embodiment, the buffer materials 320 may be, for example, spring members that bias the battery cells 210 toward the reference position 510.

The plurality of battery cells 210 is rechargeable batteries.

As illustrated in FIG. 1, the each of the plurality of battery cells 210 is formed in an approximately rectangular flat shape in side view. The each of the plurality of battery cells 210 is set in such a manner as to have the same shape and dimensions.

The each of the plurality of battery cells 210 includes, for example, a pair of the front and back cell terminals 220. Each of the pairs of the front and back cell terminals 220 stands upward from an upper end surface of its corresponding battery cell 210.

The shape of the cell terminals 220 is not particularly limited. As an example, the cell terminals 220 are formed in an approximately rectangular flat shape in side view, and surfaces thereof face in the first direction.

The each of the connection terminals 55 is connected to one cell terminal 220.

In the case of the embodiment, the connection terminal 55 is connected to the cell terminal 220 in a position orthogonal to the main body 11 as illustrated in FIG. 8A. Note that in FIGS. 8A and 8B, the cell terminal 220 is illustrated by chain double-dashed lines.

Consequently, the connection terminal 55 can follow the movement of the cell terminal 220, and move smoothly in the direction away from the reference position 510 in the first direction.

In the case of the embodiment, the connection terminal 55 is connected to the cell terminal 220 via, for example, a welded plate 40 as illustrated in FIG. 8A.

Figure 8B:
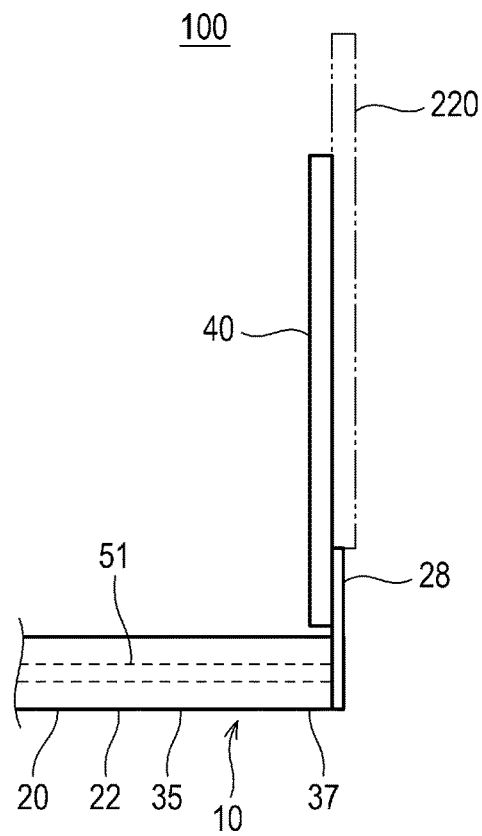

The shape of the welded plate 40 is not particularly limited. As an example, the welded plate 40 is formed in an approximately rectangular flat shape in side view, and surfaces thereof face in the first direction, as illustrated in FIG. 8B.

The welded plate 40 is placed on one of surfaces of the cell terminal 220, and is joined by welding to the one of the surfaces. As illustrated in FIGS. 8A and 8B, a side end portion, which is closer to the branch portion 20, of the welded plate 40 lies off the cell terminal 220 toward the branch portion 20. The distal end protruding portion 28 of the branch portion 20, and by extension the connection terminal 55, is connected to the portion, which lies off the cell terminal 220, of the welded plate 40. In more detail, the distal end portion of the distal end protruding portion 28 is placed, for example, on top of a surface, which is closer to the cell terminal 220, of the welded plate 40, and is soldered to the surface closer to the cell terminal 220.

In this manner, the connection terminal 55 is electrically connected to the cell terminal 220 in the position orthogonal to the main body 11.

However, in the embodiment, the method for connecting the connection terminal 55 to the cell terminal 220 is not limited to this example. The connection terminal 55 may be, for example, connected directly to the cell terminal 220 not via the welded plate 40.

Moreover, as illustrated in FIGS. 5 and 6, the outer leg portion 72 of the above busbar 70 is placed on a surface, which is opposite to the welded plate 40, of the cell terminal 220, and is joined to the opposite surface.

Note that in the embodiment, the busbars 70 are not necessarily connected to all the cell terminals 220, respectively. In the case of the embodiment, among the plurality of the cell terminals 220, the cell terminal 220 located furthest to the left and the cell terminal 220 located furthest to the right are not connected to the busbars 70.

In the case of the embodiment, as an example, the voltage monitoring module 100 is disposed between the left side wall portion 312 and the right side wall portion 314 of the housing 310, and is placed above the battery pack 200, as illustrated in FIG. 2.

In more detail, a left end portion of the plate-shaped member 60 is fixed to an upper end of the left side wall portion 312 of the housing 310. A right end portion of the plate-shaped member 60 is fixed to an upper end of the right side wall portion 314 of the housing 310. In this manner, the plate-shaped member 60, and by extension the voltage monitoring module 100, is disposed between the left side wall portion 312 and the right side wall portion 314, and placed above the battery pack 200. In this state, as described above, the voltage monitoring module 100 is mounted on the housing 310 and the battery pack 200 in such a manner that the longitudinal direction of the main body 11 (the first direction) is aligned with the stacking direction of the battery cells 210.

As illustrated in FIG. 2, the main body 11 extends in the first direction between the pairs of the front and back cell terminals 220. The connection terminal 55 of each of the plurality of first branch portions 21a that branches off the front edge of the main body 11 is connected to its corresponding front cell terminal 220. The connection terminal 55 of each of the plurality of second branch portions 21b that branches off the back edge of the main body 11 is connected to its corresponding the back cell terminal 220.

An example of operation during the discharge and charge of the battery unit 300 is described in more detail below with reference to FIGS. 4A to 6.

As described above, during the discharge of the battery pack 200, the each of the plurality of battery cells 210 contracts inward relative to the reference position 510 (the central position of the battery pack 200). Each of the battery cells 220 moves in the direction closer to the reference position 510 in the first direction accompanied by the contraction of the plurality of battery cells 210.

During the charge of the battery pack 200, the each of the plurality of battery cells 210 expands outward relative to the reference position 510 (the central position of the battery pack 200). The cell terminals 220 move in the direction away from the reference position 510 in the first direction accompanied by the expansion of the plurality of battery cells 210.

In more detail, during the charge of the battery pack 200, the cell terminals 220 of the battery cells 210 located on the left side of the reference position 510 move to the left. Also, the connection terminals 55 connected to the cell terminals 220 on the left side move to the left, following the movement of the cell terminals 220 on the left side. Moreover, the cell terminals 220 of the battery cells 210 located on the right side of the reference position 510 move to the right, and the connection terminals 55 connected to the cell terminals 220 on the right side also move to the right, following the movement of the cell terminals 220 on the right side (refer to FIG. 4B). At this point in time, the connection terminals 55 move horizontally, maintaining the constant height position. Moreover, in the example illustrated in FIG. 6, a portion of each of the first-direction extension portions 22 deforms into the shape that curves and is folded back from a direction of the reference position 510 toward a direction opposite to the reference position 510 as described above. Moreover, as illustrated in FIG. 6, the curved portion 76 of the each of the busbars 70 deforms in such a manner that its opening width increases in the first direction. Consequently, the busbars 70 can excellently follow the movement of the cell terminals 220.

During the discharge of the battery pack 200, the cell terminals 220 of the battery cells 210 located on the left side of the reference position 510 move to the right, and the connection terminals 55 connected to the cell terminals 220 on the left side also move to the right, following the movement of the cell terminals 220 on the left side. Moreover, the cell terminals 220 of the battery cells 210 located on the right side of the reference position 510 move to the left, and the connection terminals 55 connected to the cell terminals 220 on the right side also move to the left, following the movement of the cell terminals 220 on the right side (refer to FIG. 4A). At this point in time, the connection terminals 55 move horizontally, maintaining the constant height position. Moreover, in the example illustrated in FIG. 5, the portion of the first-direction extension portion 22 deforms (returns) from the folded-back shape (refer to FIG. 6) into the shape extending substantially even. Moreover, as illustrated in FIG. 5, the curved portion 76 of the each of the busbars 70 deforms in such a manner that its opening width decreases in the first direction. Consequently, the busbars 70 can excellently follow the movement of the cell terminals 220.

The farther the cell terminal 220 is located from the reference position 510, the larger amount of movement the cell terminal 220 has. As described above, in the case of the embodiment, the farther the branch portion 20 is located from the reference position 510, the longer length dimension (the length dimension of the first-direction extension portion 22) the branch portion 20 has.

Hence, the connection terminal 55 connected to the cell terminal 220 located farther from the reference position 510 can also excellently follow the movement of the cell terminal 220.

Second Embodimnet

Figure 9:
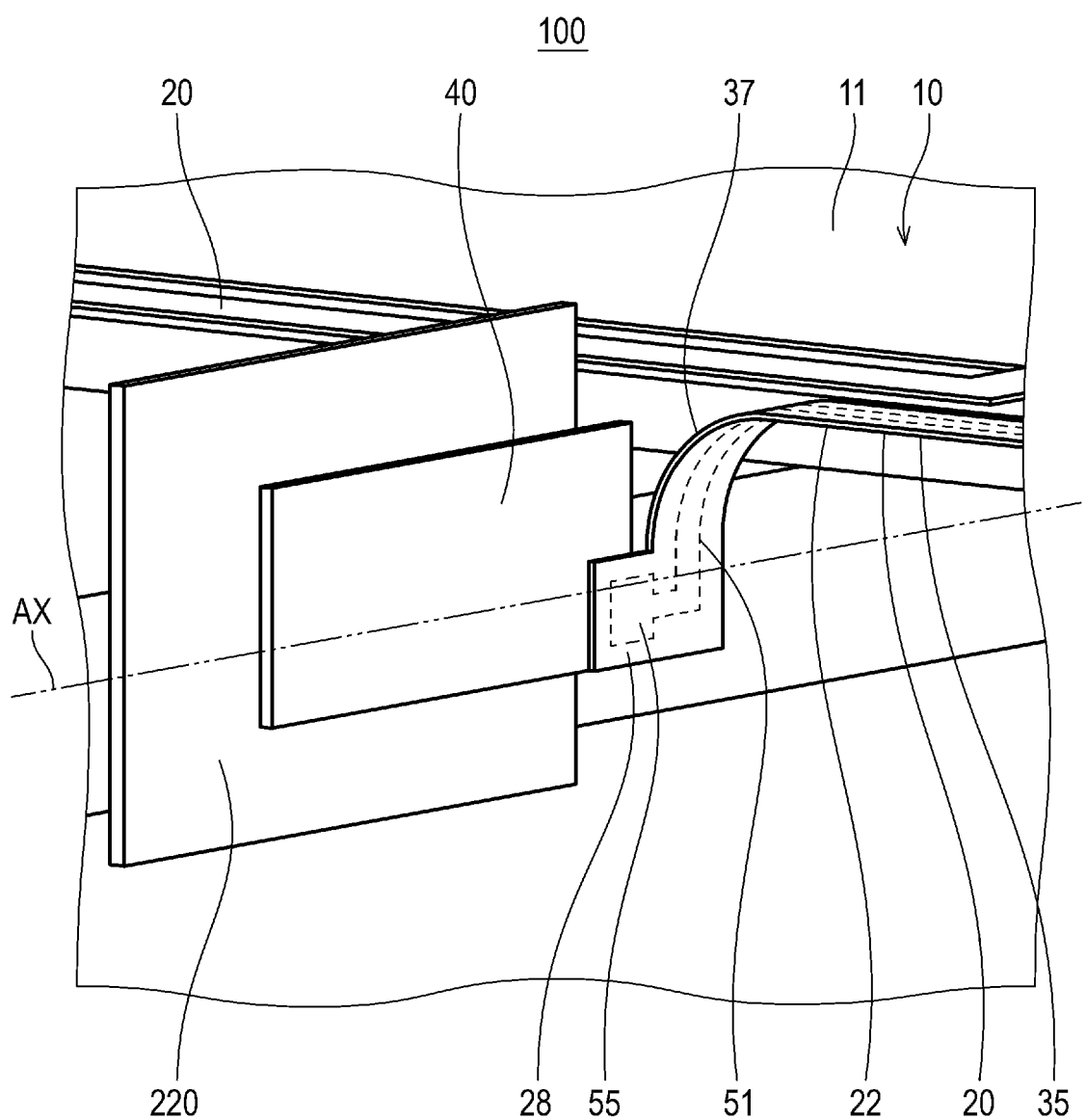
FIG. 9 is a partial enlarged perspective view of a connection terminal and a peripheral structure thereof in a second embodiment.

Next, a second embodiment is described with reference to FIG. 9. Note that FIG. 9 illustrates a close-up of the connection terminal 55 and a peripheral structure thereof. In FIG. 9, the illustration of the wire 51 is omitted.

The voltage monitoring module 100 according to the embodiment is different from the voltage monitoring module 100 according to the above first embodiment in a respect described below, and is configured similarly to the voltage monitoring module 100 according to the above first embodiment in the other respects.

In the example described in the above first embodiment, the second portion 37 of the branch portion 20 is bent upward approximately 90 degrees around the axis AX. In terms of this, in an aspect of the present disclosure, the second portion 37 may be bent, for example, downward approximately 90 degrees around the axis AX as illustrated in FIG. 9. In such a configuration, the connection terminal 55 can be excellently connected to the cell terminal 220, for example, even when a portion of the cell terminal 220 is placed below the main body 11.

Third Embodiment

Figure 10:
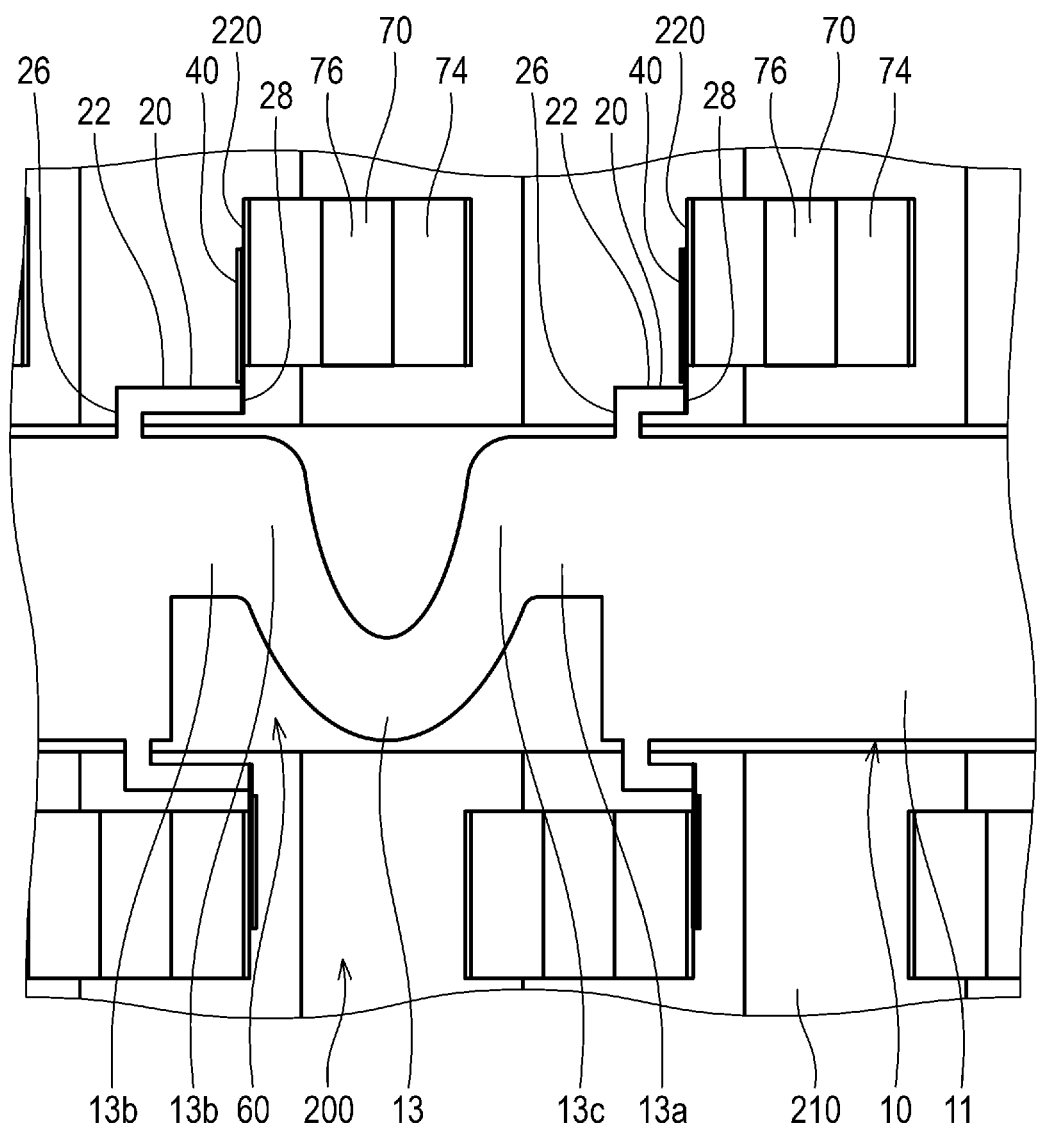
FIG. 10 is a partial enlarged plan view of a main body meandering portion and a peripheral structure thereof in a third embodiment.

Next, a third embodiment is described with reference to FIG. 10. Note that FIG. 10 illustrates a close-up of a main body meandering portion 13 and a peripheral structure thereof. In FIG. 10, the illustration of the wires 51 is omitted.

The voltage monitoring module 100 according to the embodiment is different from the voltage monitoring module 100 according to the above first and second embodiments in a respect described below, and is configured similarly to the voltage monitoring module 100 according to the above first and second embodiments in the other respects.

As illustrated in FIG. 10, in the case of the embodiment, a portion of the main body 11 is the main body meandering portion 13 that extends, meandering, in the first direction.

According to such a configuration, the stretching and contracting of the main body meandering portion 13 enables the main body 11 to stretch and contract in the first direction, following the movement of the cell terminals 220. Hence, as compared to the first embodiment, the main body 11 is stretchable in the first direction, and the movable range of the connection terminals 55 that follow the cell terminals 220 can be increased accordingly.

The main body meandering portion 13 is formed in an arc shape that is convex toward one side in the second direction in plan view. Moreover, portions of the main body 11 at two ends of the main body meandering portion 13 are formed as straight portions 13a that extend linearly.

The main body meandering portion 13 and the straight portions 13a are each formed with a narrower width than the other portion of the main body 11. Moreover, the main body meandering portion 13 stays within a rectangle that circumscribes the main body 11 in plan view.

During the charge of the battery pack 200, the main body meandering portion 13 deforms in such a manner that a separation distance in the first direction between one end 13b and the other end 13c of the main body meandering portion 13 increases and the amount of protrusion of the main body meandering portion 13 reduces. Consequently, the dimension of the main body 11 in the first direction increases.

During the discharge of the battery pack 200, the main body meandering portion 13 deforms in such a manner that the separation distance in the first direction between the one end 13b and the other end 13c of the main body meandering portion 13 decreases and the amount of protrusion of the main body meandering portion 13 increases. Consequently, the dimension of the main body 11 in the first direction decreases.

Note that in the case of the embodiment, it is preferable that the heat staked portion 18 be formed on the inner side (closer to the reference position 510) in the first direction than the main body meandering portion 13. Moreover, it is preferable that a portion, which is on the outer side than the main body meandering portion 13, of the main body 11 be not joined to the plate-shaped member 60.

Moreover, in the embodiment, the shape of the main body meandering portion 13 is not limited to this example. The main body meandering portion 13 may be formed in, for example, a curved waveform, or an approximately square waveform, in plan view. Moreover, in the embodiment, the entire main body 11 may be the main body meandering portion 13.

Forth Embodiment

Figure 11A:
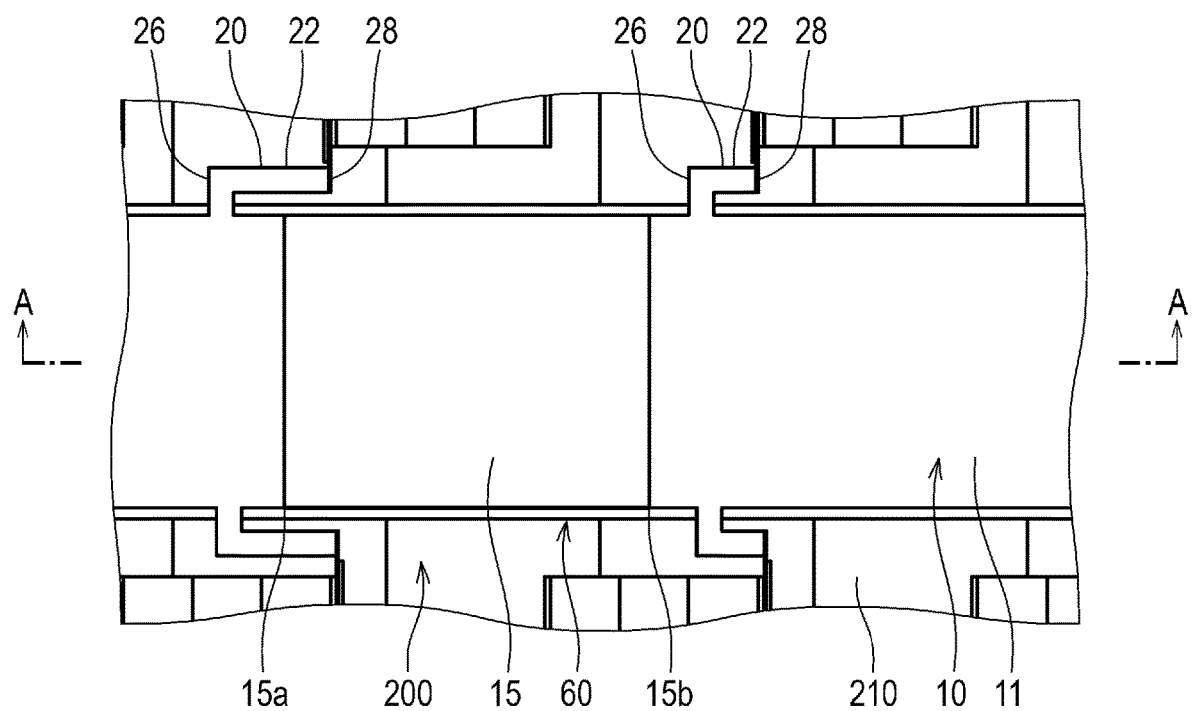
FIG. 11A is a partial enlarged plan view of a curved portion and a peripheral structure thereof in a fourth embodiment.
Figure 11B:
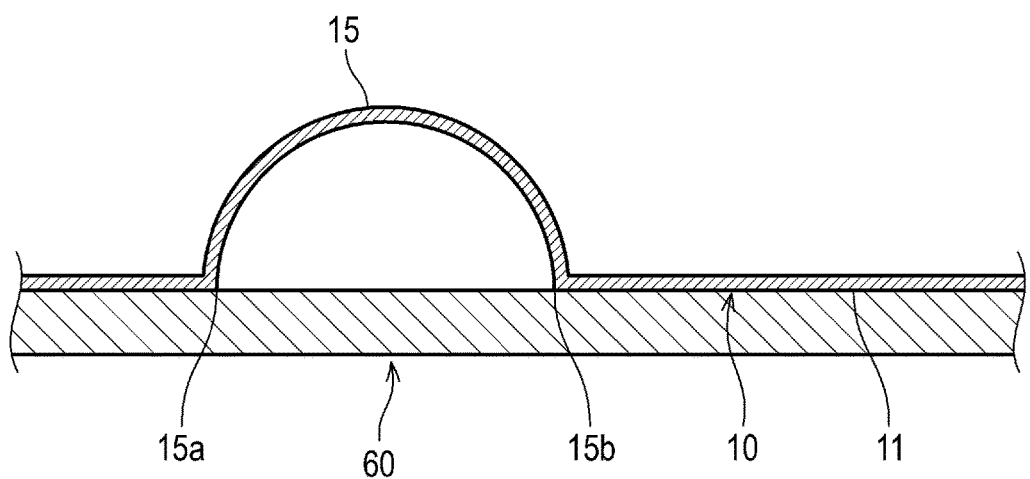
FIG. 11B is a sectional end view taken along line A-A illustrated in FIG. 11A.

Next, a fourth embodiment is described with reference to FIGS. 11A and 11B. Note that FIGS. 11A and 11B illustrate a close-up of a curved portion 15 and a peripheral structure thereof. In FIG. 11A, the illustration of the wires 51 is omitted.

The voltage monitoring module 100 according to the embodiment is different from the voltage monitoring module 100 according to the above first to third embodiments in a respect described below, and is configured similarly to the voltage monitoring module 100 according to the above first to third embodiments in the other respects.

As illustrated in FIGS. 11A and 11B, in the case of the embodiment, a portion of the main body 11 is formed as the curved portion 15 that curves in a direction perpendicular to the other portion of the main body 11 (a perpendicular direction to the other portion).

According to such a configuration, the main body 11, in addition to the branch portions 20, can deform, following the movement of the cell terminals 220.

In more detail, the curved portion 15 is formed in, for example, an arc shape that is convex upward in front view.

The width dimension of the curved portion 15 is set at a dimension equal to the width dimension of the other portion of the main body 11.

During the charge of the battery pack 200, the curved portion 15 deforms in such a manner that a separation distance in the first direction between one end 15a and the other end 15b of the curved portion 15 increases and the amount of protrusion of the curved portion 15 reduces. Consequently, the dimension of the main body 11 in the first direction increases.

Moreover, during the discharge of the battery pack 200, the curved portion 15 deforms in such a manner that the separation distance in the first direction between the one end 15a and the other end 15b of the curved portion 15 decreases and the amount of protrusion of the curved portion 15 increases. Consequently, the dimension of the main body 11 in the first direction decreases.

Note that in the case of the embodiment, it is preferable that the heat staked portion 18 be formed on the inner side (closer to the reference position 510) in the first direction than the curved portion 15. Moreover, it is preferable that a portion, which is on the outer side than the curved portion 15, of the main body 11 be not joined to the plate-shaped member 60.

Fifth Embodiment

Figure 12A:
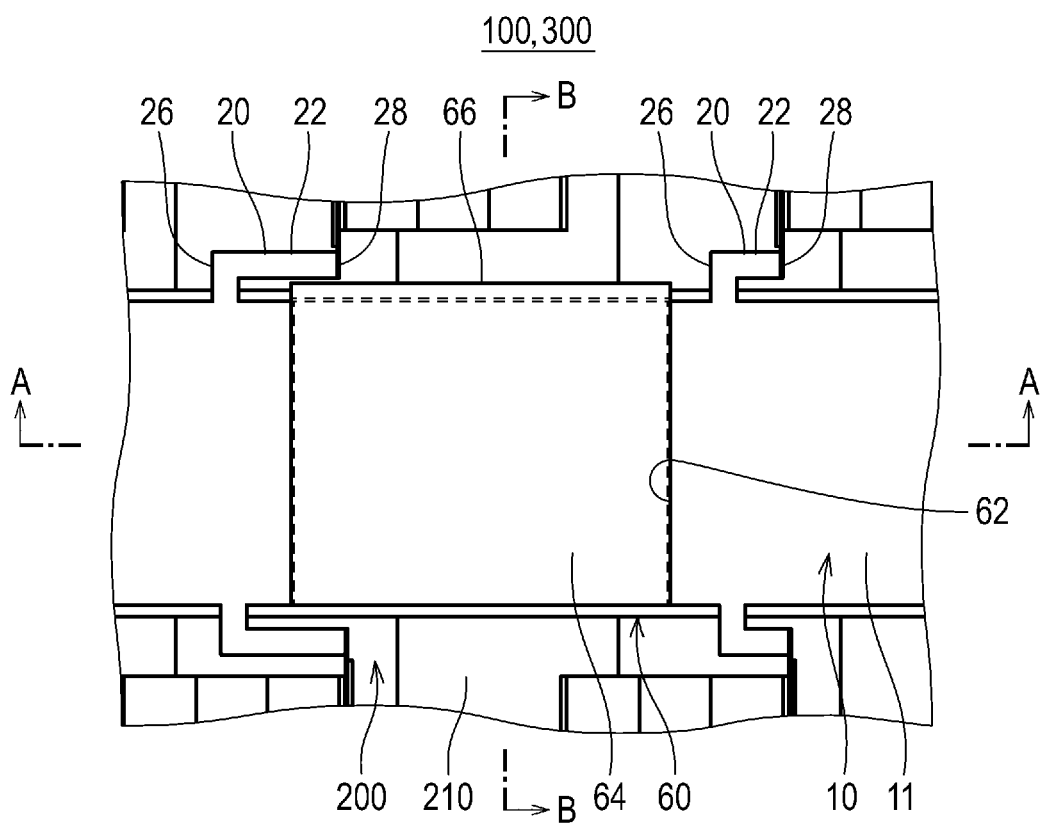

Next, a fifth embodiment is described with reference to FIGS. 12A to 13B. Note that FIG. 12A illustrates a close-up of an opening portion 62 and a peripheral structure thereof.

The voltage monitoring module 100 according to the embodiment is different from the voltage monitoring module 100 according to the above first to fourth embodiments in a respect described below, and is configured similarly to the voltage monitoring module 100 according to the above first to fourth embodiments in the other respects.

Figure 13A:
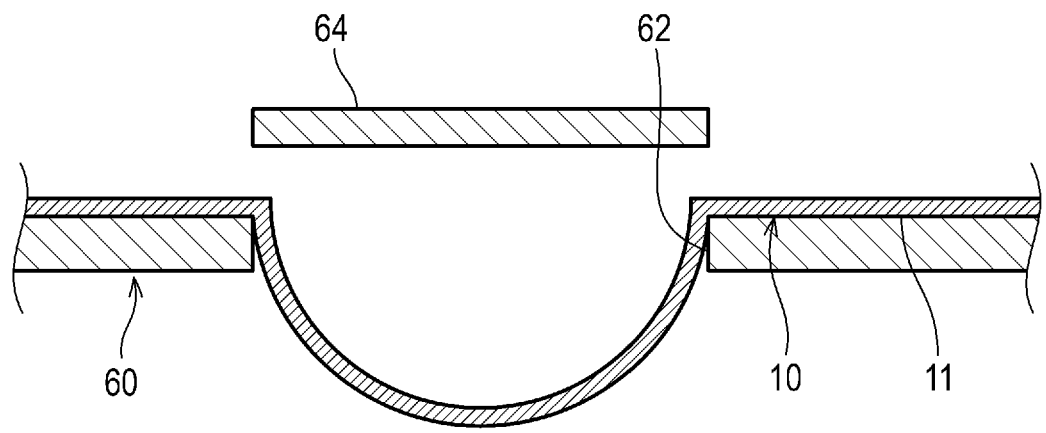
Figure 13B:
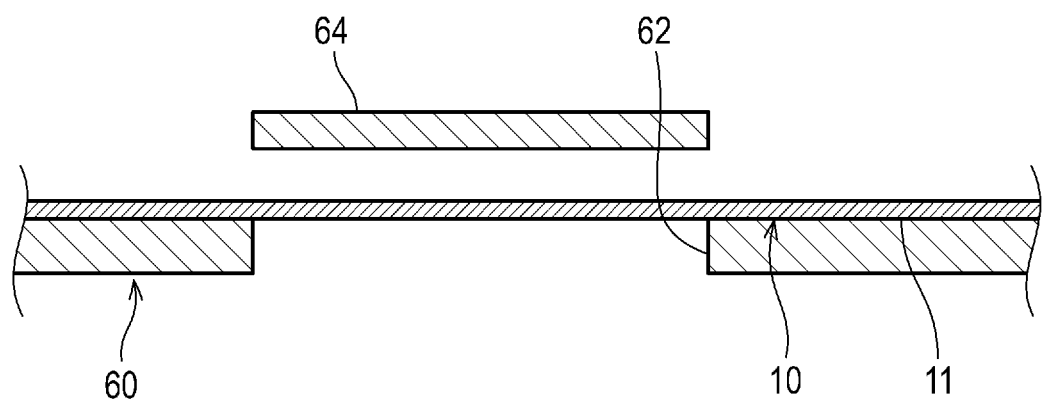

Also in the case of the embodiment, the main body 11 is placed along one of surfaces (for example, the top surface) of the plate-shaped member 60 as in the above embodiments. However, in the case of the embodiment, the opening portion 62 that corresponds to a portion of the main body 11 in the first direction is formed in the plate-shaped member 60 as illustrated in FIGS. 13A and 13B. Note that "the opening portion 62 corresponds to the portion of the main body 11 in the first direction" indicates here that at least the portion of the main body 11 in the first direction overlaps a portion of the opening portion 62 in plan view.

When the dimension of the main body 11 in the first direction decreases, the portion of the main body 11 can curve and protrude through the opening portion 62 as illustrated in FIGS. 13A and 13B.

Such a configuration also enables the main body 11, in addition to the branch portions 20, to stretch and contract, following the movement of the cell terminals 220.

In more detail, during the discharge of the battery pack 200, the portion of the main body 11 curves and turns into a protruding state of protruding downward through the opening portion 62, as illustrated in FIG. 13A. Consequently, the dimension of the main body 11 in the first direction decreases.

On the other hand, during the charge of the battery pack 200, the portion of the main body 11 deforms into an even shape as compared to the state illustrated in FIG. 13A and turns into a non-protruding state of not protruding through the opening portion 62 as illustrated in FIG. 13B. Consequently, the dimension of the main body 11 in the first direction increases.

Figure 12B:
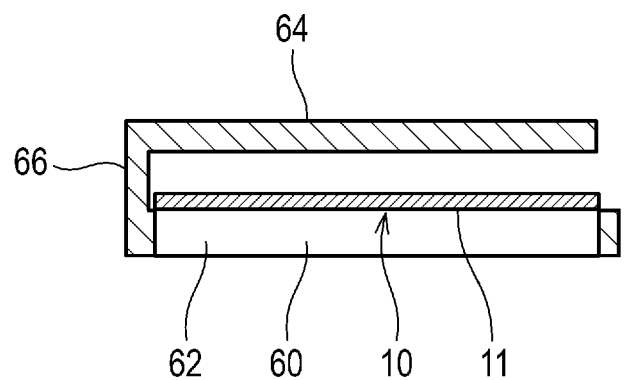

As illustrated in FIG. 12B, a holding portion 64 is placed above the opening portion 62 with the portion of the main body 11 therebetween. As illustrated in FIGS. 13A and 13B, the holding portion 64 is formed in an even flat shape, and placed horizontally. The holding portion 64 is formed in an approximately rectangular shape in plan view. A back end portion of the holding portion 64 is connected to, for example, a back edge portion of the plate-shaped member 60 via a coupling portion 66.

In this manner, the holding portion 64 is placed above the opening portion 62. Hence, it is possible to restrict the protrusion of the portion, which corresponds to the opening portion 62, of the main body 11 toward a side opposite to the opening portion 62 (upward) when the portion deforms from the non-protruding state (refer to FIG. 13B) into the protruding state (FIG. 13A).

Note that in the case of the embodiment, it is preferable that the heat staked portion 18 be formed on the inner side (closer to the reference position 510) in the first direction than the opening portion 62. Moreover, it is preferable that a portion, which is on the outer side than the opening portion 62, of the main body 11 be not jointed to the plate-shaped member 60.

Moreover, in the embodiment, the direction in which the portion of the main body 11 protrudes is not limited to downward. For example, the portion of the main body 11 may be configured in such a manner as to be capable of protruding upward through the opening portion 62. In this case, the holding portion 64 is placed below the opening portion 62.

Moreover, in the embodiment, for example, it may be configured in such a manner that, also during the discharge of the battery pack 200, the portion of the main body 11 protrudes through the opening portion 62 and the amount of protrusion thereof changes accompanied by the expansion and contraction of the battery cells 210.

Sixth Embodiment

Figure 14:
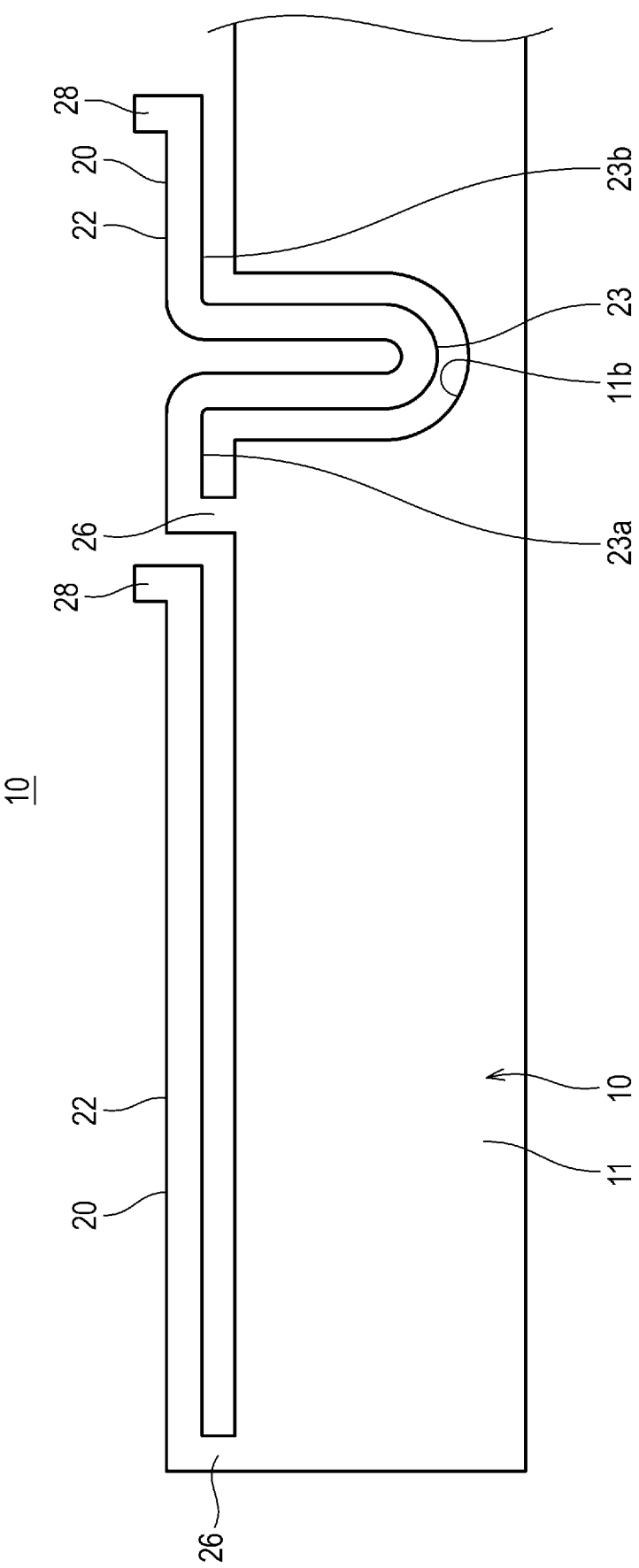
FIG. 14 is a partial enlarged plan view of a branch portion and a peripheral structure thereof in a sixth embodiment.

Next, a sixth embodiment is described with reference to FIG. 14. Note that FIG. 14 illustrates a close-up of a meandering extension portion 23 and a peripheral structure thereof. Moreover, in FIG. 14, the illustration of the wires 51 is omitted.

The voltage monitoring module 100 according to the embodiment is different from the voltage monitoring module 100 according to the above first to fifth embodiments in a respect described below, and is configured similarly to the voltage monitoring module 100 according to the above first to fifth embodiments in the other respects.

In the case of the embodiment, a portion of the first-direction extension portion 22 is the meandering extension portion 23 that extends, meandering, in the first direction as illustrated in FIG. 14.

According to such a configuration, it is possible to secure a sufficient length dimension of the first-direction extension portion 22; therefore, it is possible to secure a sufficient movable range of the connection terminal 55.

In more detail, in the case of the embodiment, a middle portion of the first-direction extension portion 22 is the meandering extension portion 23 as illustrated in FIG. 14. On the other hand, two end portions (one end portion 23a and the other end portion 23b) of the first-direction extension portion 22 extend linearly in the first direction.

The other end portion 23b of the first-direction extension portion 22 is placed, for example, on an extension of the one end portion 23a. The meandering extension portion 23 extends, for example, from a distal end of the one end portion 23a toward a proximal end of the other end portion 23b, making a U-turn.

The meandering extension portion 23 is formed in, for example, an approximately U-shape in plan view.

Moreover, a notch shape portion 11b is formed in a part, which corresponds to the meandering extension portion 23, of the main body 11. The notch shape portion 11b penetrates the main body 11 in the up-and-down direction, and is open backward. A portion of the meandering extension portion 23 fits in the notch shape portion 11b in plan view. In other words, the portion of the meandering extension portion 23 is disposed deeper into the main body 11 than the protruding portion 26.

Figure 15:
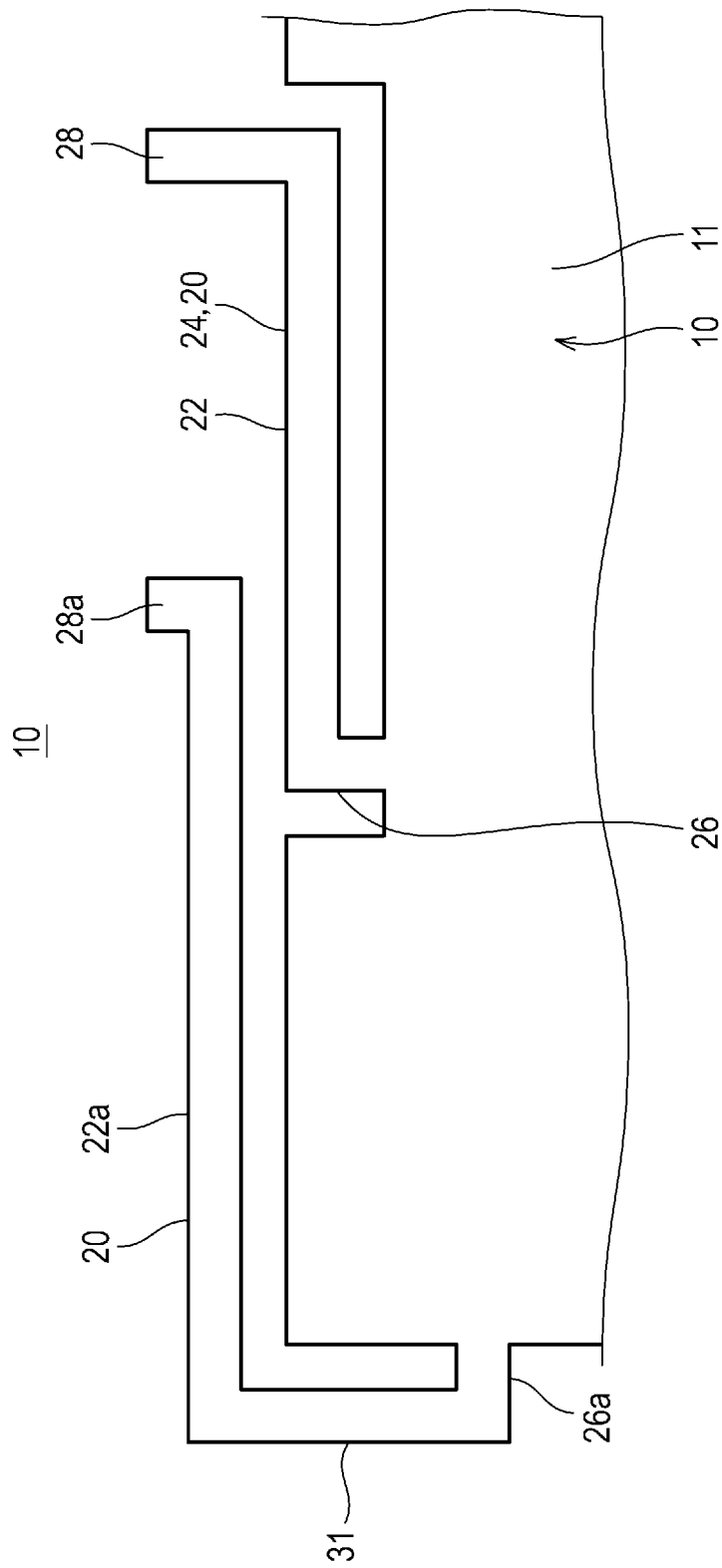
FIG. 15 is a partial enlarged plan view of a branch portion and a peripheral structure thereof in a seventh embodiment.

During the expansion of the battery pack 200, the meandering extension portion 23 stretches in the first direction accompanied by the connection terminal 55 following the movement of the cell terminal 220. Hence, the movable range of the connection terminal 55 can be secured excellently, Seventh Embodiment Next, a seventh embodiment is described with reference to FIG. 15. Note that FIG. 15 illustrates a close-up of two branch portions 20 and a peripheral structure thereof. Moreover, in FIG. 15, the illustration of the connection terminals 55 and the wires 51 is omitted.

The voltage monitoring module 100 according to the embodiment is different from the voltage monitoring module 100 according to the above first to sixth embodiments in a respect described below, and is configured similarly to the voltage monitoring module 100 according to the above first to sixth embodiments in the other respects.

In the case of the embodiment, as illustrated in FIG. 15, the branch portion 20 located at one end (the left end in the case of the embodiment) in the first direction includes a protruding portion 26a that protrudes in the first direction from one end of the main body 11 in the first direction, a primary extension portion 31 that extends from a distal end portion of the protruding portion 26a in the second direction (backward in the case of the embodiment) orthogonal to both of the normal direction of the main body 11 and the first direction, a first-direction extension portion 22a that extends from a distal end portion of the primary extension portion 31 in a direction opposite to the direction in which the protruding portion 26a protrudes, and a distal end protruding portion 28a that protrudes in the second direction from a distal end portion of the first-direction extension portion 22a. The distal end protruding portion 28a includes the connection terminal 55. In this manner, in the embodiment, the branch portion 20 may be routed in the same direction as the direction in which the cell terminal 220 moves when the battery cell 210 expands. Such a configuration also enables the connection terminal 55 to excellently follow the movement of the cell terminal 220 accompanied by the contraction or expansion of the battery cell 210.

Eighth Embodiment

Figure 16:
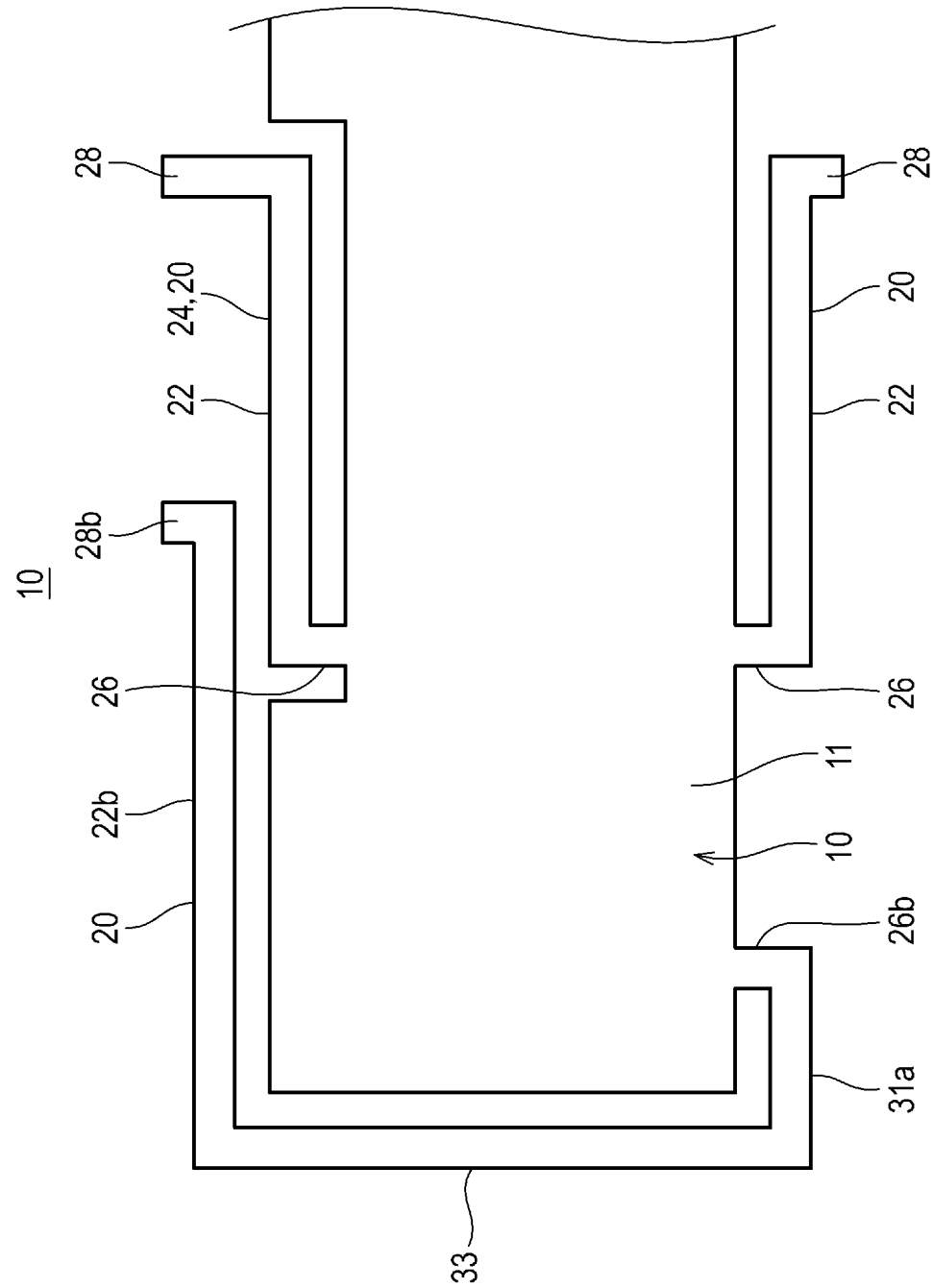
FIG. 16 is a partial enlarged plan view of a branch portion and a peripheral structure thereof in an eighth embodiment.

Next, an eight embodiment is described with reference to FIG. 16. Note that FIG. 16 illustrates a close-up of two branch portions 20 and a peripheral structure thereof. Moreover, in FIG. 16, the illustration of the connection terminals 55 and the wires 51 is omitted.

The voltage monitoring module 100 according to the embodiment is different from the voltage monitoring module 100 according to the above first to seventh embodiments in a respect described below, and is configured similarly to the voltage monitoring module 100 according to the above first to seventh embodiments in the other respects.

In the case of the embodiment, as illustrated in FIG. 16, the branch portion 20 located at one end (the left end in the case of the embodiment) in the first direction includes a protruding portion 26b that protrudes from the main body 11 in the second direction (backward in the case of the embodiment) orthogonal to both of the normal direction of the main body 11 and the first direction, a primary extension portion 31a that extends in the first direction from a distal end portion of the protruding portion 26b beyond one end (the left end in the case of the embodiment) of the main body 11 in the first direction, a secondary extension portion 33 that extends in a direction opposite to the direction in which the protruding portion 26b protrudes (forward in the case of the embodiment), from a distal end portion of the primary extension portion 31a beyond an edge (the back edge in the case of the embodiment) of the main body 11 in the second direction, a first-direction extension portion 22b that extends from a distal end portion of the secondary extension portion 33 in a direction opposite to the direction in which the primary extension portion 31a extends, and a distal end protruding portion 28b that protrudes from a distal end portion of the first-direction extension portion 22b in a direction opposite to the direction in which the protruding portion 26b protrudes. The distal end protruding portion 28b includes the connection terminal 55.

In this manner, in the embodiment, the branch portion 20 may be routed, detouring around the one end portion of the main body 11. Such a configuration also enables the terminal 55 to excellently follow the movement of the cell terminal 220 accompanied by the contraction or expansion of the battery cell 210.

The branch portion 20 located at the one end (the left end in the case of the embodiment) in the first direction, which is mentioned herein, indicates the branch portion 20 located furthest to the one end among the plurality of branch portions 20.

Ninth Embodiment

Next, a ninth embodiment is described with reference to FIGS. 17A and 17B. Note that FIG. 17A illustrates a close-up of a cover portion 67 and a peripheral structure thereof.

The voltage monitoring module 100 according to the embodiment is different from the voltage monitoring module 100 according to the above first to eighth embodiments in a respect described below, and is configured similarly to the voltage monitoring module 100 according to the above first to eighth embodiments in the other respects.

In the example described in the above first embodiment, the main body 11 is fixed by heat staking to the plate-shaped member 60. In terms of this, in an aspect of the present disclosure, the method for fixing the main body 11 to the plate-shaped member 60 is not limited to this example.

Figure 17A:
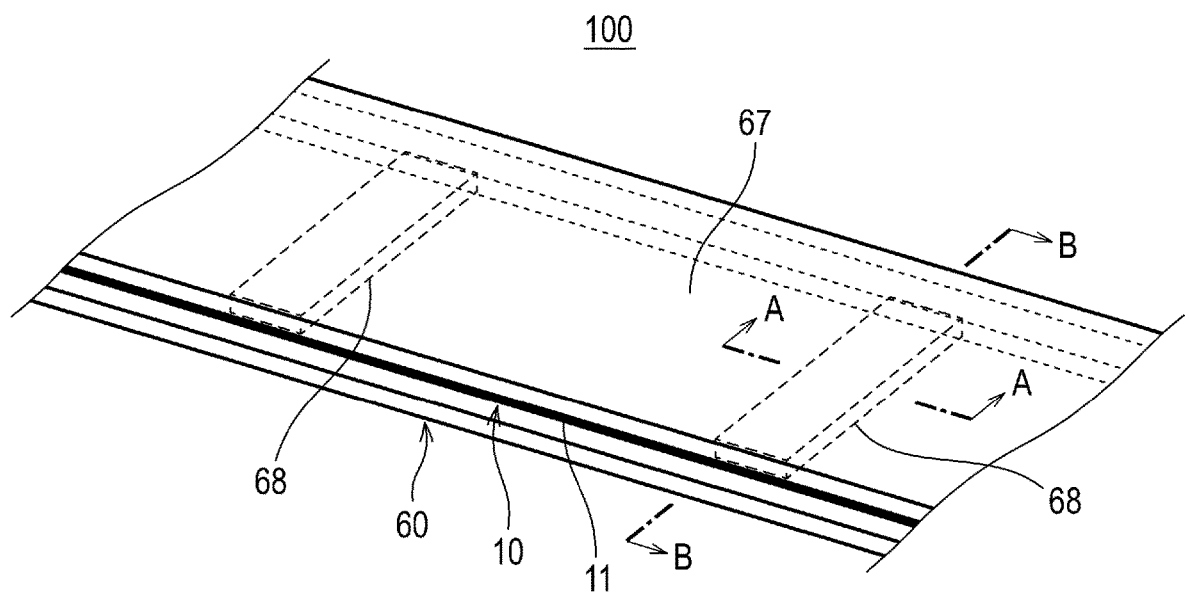
FIG. 17A is a partial enlarged perspective view of a cover portion and a peripheral structure thereof in a ninth embodiment.
Figure 17B:
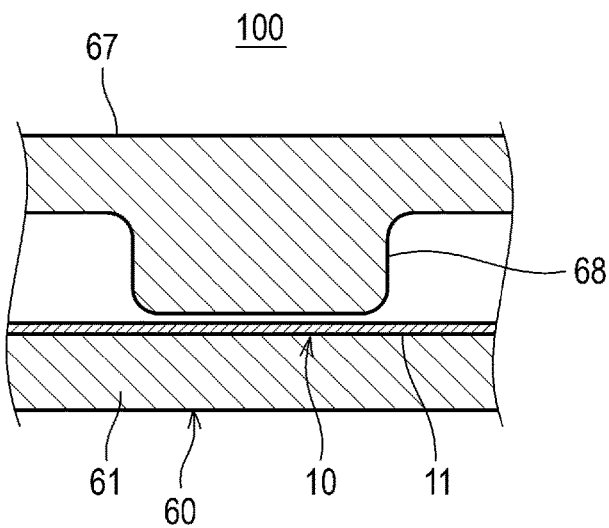
FIG. 17B is a sectional end view taken along line A-A illustrated in FIG. 17A.

In the case of the embodiment, as illustrated in FIGS. 17A and 17B, for example, the voltage monitoring module 100 includes the cover portion 67 placed above a portion of the main body 11 in the first direction, in addition to the plate-shaped member 60, and the cover portion 67 has a ridge portion 68 that protrudes downward. The portion of the main body 11 in the first direction is sandwiched in the up-and-down direction between the plate-shaped member 60 and the ridge portion 68 and therefore fixed to the plate-shaped member 60.

In more detail, the cover portion 67 is formed in an even flat shape and placed horizontally. For example, the cover portion 67 is fixed to the housing 310, placed above the plate-shaped member 60.

For example, one or more ridge portions 68 are formed on an undersurface of the cover portion 67. The ridge portions 68 protrude downward, and extend in the second direction. An undersurface of the ridge portion 68 is formed even and placed horizontally. The undersurface of the ridge portion 68 faces a top surface of the main body 11 in the up-and-down direction. Moreover, as illustrated in FIG. 17B, a slight gap is formed in the up-and-down direction between the undersurface of the ridge portion 68 and the top surface of the main body 11. Note that it is preferable that the gap in the up-and-down direction between the undersurface of the ridge portion 68 and the top surface of the main body 11 be, for example, less than the thickness dimension of the plate-shaped member 60.

According to such a configuration, it is possible to excellently fix the portion of the main body 11 in the first direction to the plate-shaped member 60.

Note that in the embodiment, the main body 11 may be fixed in a plurality of places in the first direction to the plate-shaped member 60 in this manner. In other words, the voltage monitoring module 100 may include a plurality of the cover portions 67 arranged in the first direction, and the main body 11 may be fixed in a plurality of places in the first direction to the plate-shaped member 60 by the plate-shaped member 60 and the ridge portions 68 of the plurality of the cover portions 67.

Modification of Ninth Embodiment

Next, a modification of the ninth embodiment is described with reference to FIG. 18.

The voltage monitoring module 100 according to the modification is different from the voltage monitoring module 100 according to the above ninth embodiment in a respect described below, and is configured similarly to the voltage monitoring module 100 according to the above ninth embodiment in the other respects.

Figure 18:
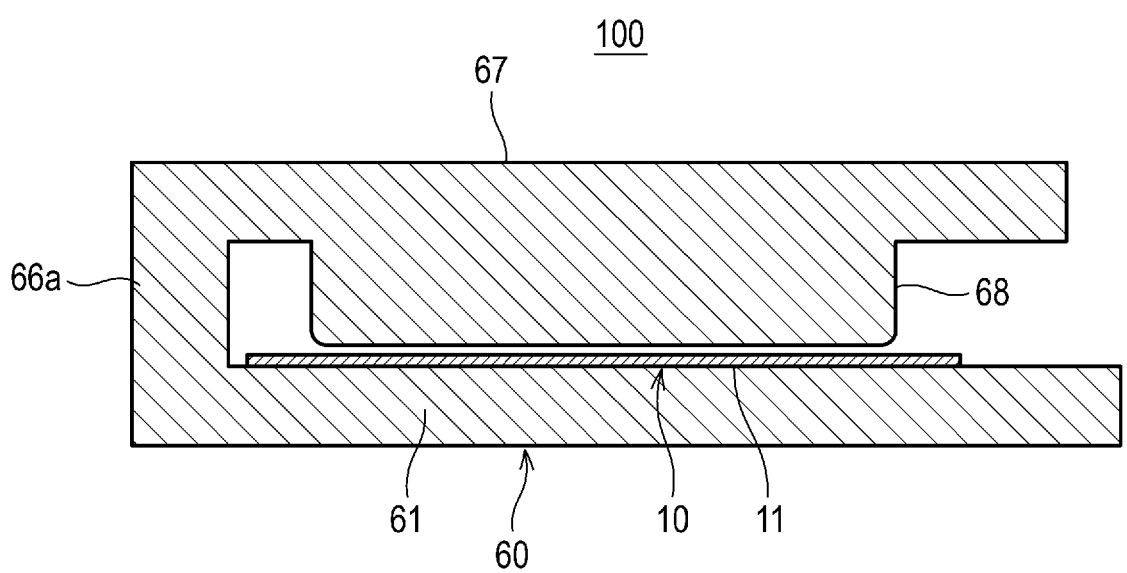
FIG. 18 is a diagram illustrating a cover portion and a peripheral structure thereof in a modification of the ninth embodiment, and is a sectional end view taken along line B-B illustrated in FIG. 17A.

In the case of the modification, the cover portion 67 is formed by a portion of the plate-shaped member 60 as illustrated in FIG. 18.

In more detail, in the case of the modification, the plate-shaped member 60 includes a main portion 61 on which the main body 11 is placed, the cover portion 67 placed above a portion of the main portion 61 in the first direction, and a coupling portion 66a that couples the main portion 61 and the cover portion 67.

In the example illustrated in FIG. 18, the coupling portion 66a couples a back edge portion of the main portion 61 and a back edge portion of the cover portion 67.

Tenth Embodiment

Figure 19A:
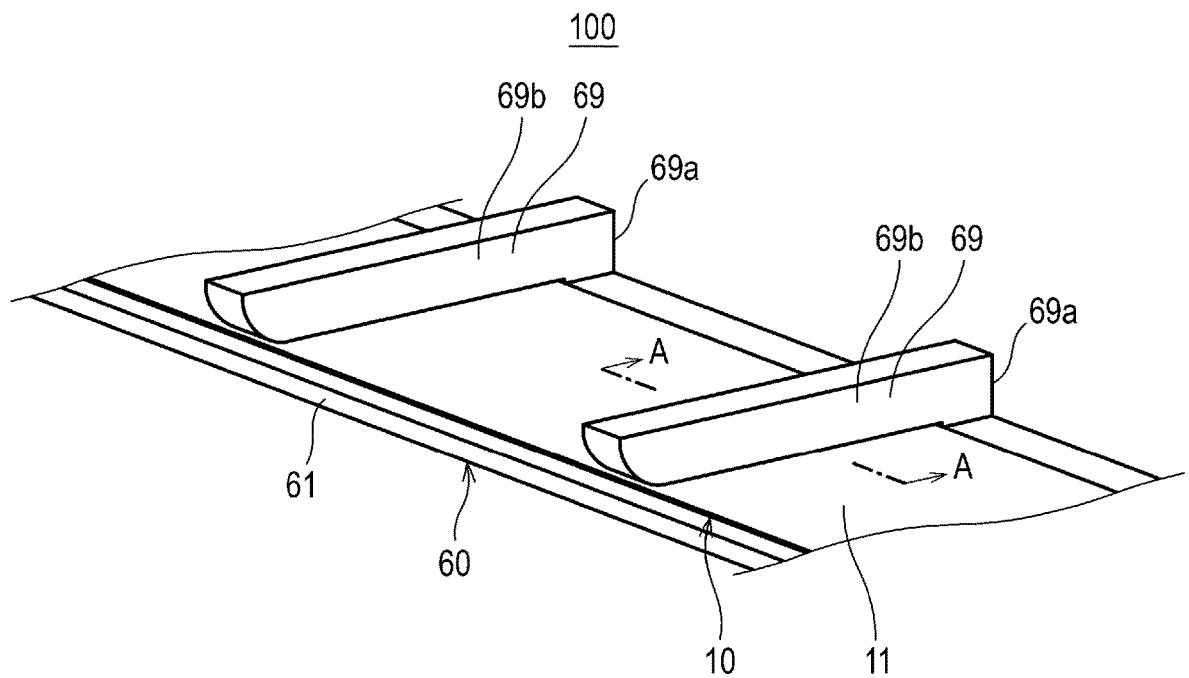
FIG. 19A is a partial enlarged perspective view of a hook portion and a peripheral structure thereof in a tenth embodiment.
Figure 19B:
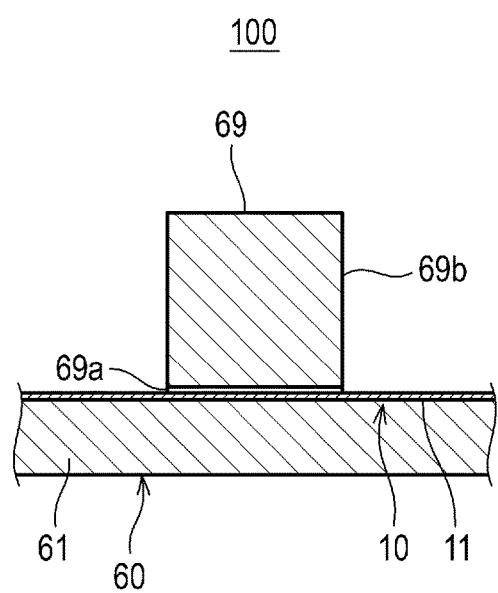
FIG. 19B is a sectional end view taken along line A-A illustrated in FIG. 19A.

Next, a tenth embodiment is described with reference to FIGS. 19A and 19B. Note that FIG. 19A illustrates a close-up of a hook portion 69 and a peripheral structure thereof. In FIGS. 19A and 19B, the illustration of the plurality of branch portions 20 and the wires 51 is omitted.

The voltage monitoring module 100 according to the embodiment is different from the voltage monitoring module 100 according to the above first to ninth embodiments in a respect described below, and is configured similarly to the voltage monitoring module 100 according to the above first to ninth embodiments in the other respects.

In the case of the embodiment, as illustrated in FIGS. 19A and 19B, the plate-shaped member 60 includes the main portion 61 on which the main body 11 is placed, and the hook portion 69 formed on a top surface of the main portion 61. At least a portion of the hook potion 69 is placed above the main body 11. A portion of the main body 11 in the first direction is sandwiched in the up-and-down direction between the main portion 61 and the hook portion 69, and therefore fixed to the plate-shaped member 60.

In more detail, the hook portion 69 includes, for example, a first portion 69a that protrudes slightly upward from the top surface of the plate-shaped member 60, and a second portion 69b that extends in the second direction from a distal end of the first portion 69a. The second portion 69b is formed in, for example, an approximately cuboid shape that is extra long in the second direction. A lower end of a distal end portion of the second portion 69b is chamfered. Hence, the main body 11 can be easily inserted between the hook portion 69 and the main portion 61 from a distal end of the hook portion 69.

As illustrated in FIG. 19A, the second portion 69b is placed above the main body 11, and extends all the way from the back edge to the front edge of the main body 11. An undersurface of the second portion 69b is formed even and placed horizontally. As illustrated in FIG. 19B, the undersurface of the second portion 69b faces a top surface of the portion of the main body 11 in the up-and-down direction. A slight gap is formed between the undersurface of the second portion 69b and the top surface of the portion of the main body 11. Note that it is preferable that the gap in the up-and-down direction between an undersurface of the hook portion 69 and the top surface of the main body 11 be, for example, less than the thickness dimension of the plate-shaped member 60.

Eleventh Embodiment

Figure 20:
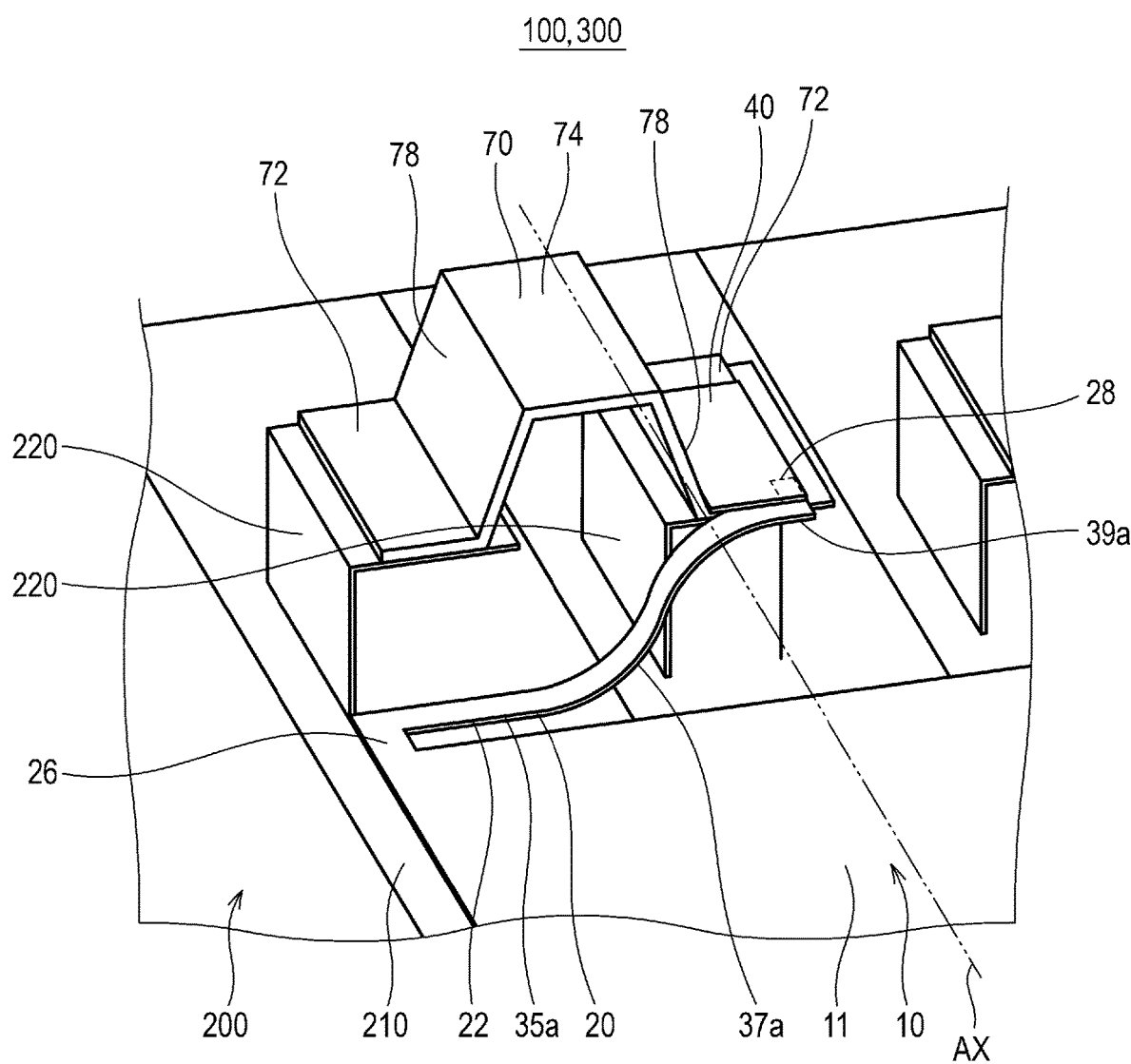
FIG. 20 is a partial enlarged perspective view of a busbar and a peripheral structure thereof in an eleventh embodiment.

Next, an eleventh embodiment is described with reference to FIG. 20. Note that FIG. 20 illustrates a close-up of one busbar 70 and a peripheral structure thereof. In FIG. 20, the illustration of the connection terminal 55 and the wire 51 is omitted.

The voltage monitoring module 100 according to the embodiment is different from the voltage monitoring module 100 according to the above first to tenth embodiments in a respect described below, and is configured similarly to the voltage monitoring module 100 according to the above first to tenth embodiments in the other respects.

In the example described in the above first embodiment, the busbar 70 is formed in an approximately M shape in front view. In terms of this, in an aspect of the present disclosure, the shape of the busbar 70 is not limited to this example. In the case of the embodiment, the busbar 70 is formed in, for example, an upward projecting shape as illustrated in FIG. 20.

In more detail, in the case of the embodiment, the surfaces of the pair of left and right outer leg portions 72 are placed, facing in the up-and-down direction. Moreover, in the case of the embodiment, the cell terminal 220 is formed in an inverted upside-down L shape in side view. The cell terminal 220 includes a horizontal portion whose surfaces face in the up-and-down direction, and a vertical portion whose surfaces face in the first direction. The outer leg portions 72 are stacked on the horizontal portion of the cell terminal 220. Moreover, in the case of the embodiment, the connection terminal 55 is placed horizontally on a top surface of the outer leg portion 72.

The main portion 74 is bent and formed in an upward projecting shape. In more detail, two end portions of the main portion 74 are formed as inclined portions 78 inclined upward toward a middle portion (a portion excluding the two end portions) of the main portion 74, respectively.

During the discharge of the battery pack 200, the busbar 70 deforms in such a manner that the angle of inclination of the inclined portions 78 increases, and therefore follows the movement of its corresponding cell terminal 220.

During the charge of the battery cell 210, the busbar 70 deforms in such a manner that the angle of inclination of the inclined portions 78 reduces, and therefore follows the movement of the corresponding cell terminal 220.

In other words, such a configuration also enables the busbar 70 to excellently deform, following the movement of the corresponding cell terminal 220.

Moreover, in the case of the embodiment, as illustrated in FIG. 20, the branch portion 20 is configured, including a first portion 35a that extends in the first direction, a second portion 37a that stands from the first portion 35a, and a third portion 39a that has the connection terminal 55 and is bent from the second portion 37a around the axis AX that intersects with both of the normal direction of the main body 11 and the first direction. The connection terminal 55 is connected to the cell terminal 220 in a state where a flat surface where the third portion 39a is present faces a flat surface where the main body 11 is present.

In more detail, for example, the second portion 37a stands, curving, upward from a distal end portion of the first portion 35a. The third portion 39a is bent inward approximately 90 degrees from a distal end of the second portion 37a around the axis AX extending in the second direction.

According to such a configuration, it is possible to excellently connect the distal end protruding portion 28 of the branch portion 20 to the connection terminal 55 placed horizontally.

However, in the embodiment, the second portion 37a may hang down, curving, from the distal end portion of the first portion 35a. In this configuration, even when the busbar 70 and the cell terminal 220 are placed below the main body 11, the connection terminal 55 can be excellently connected to the cell terminal 220.

Twelfth Embodiment

Figure 21:
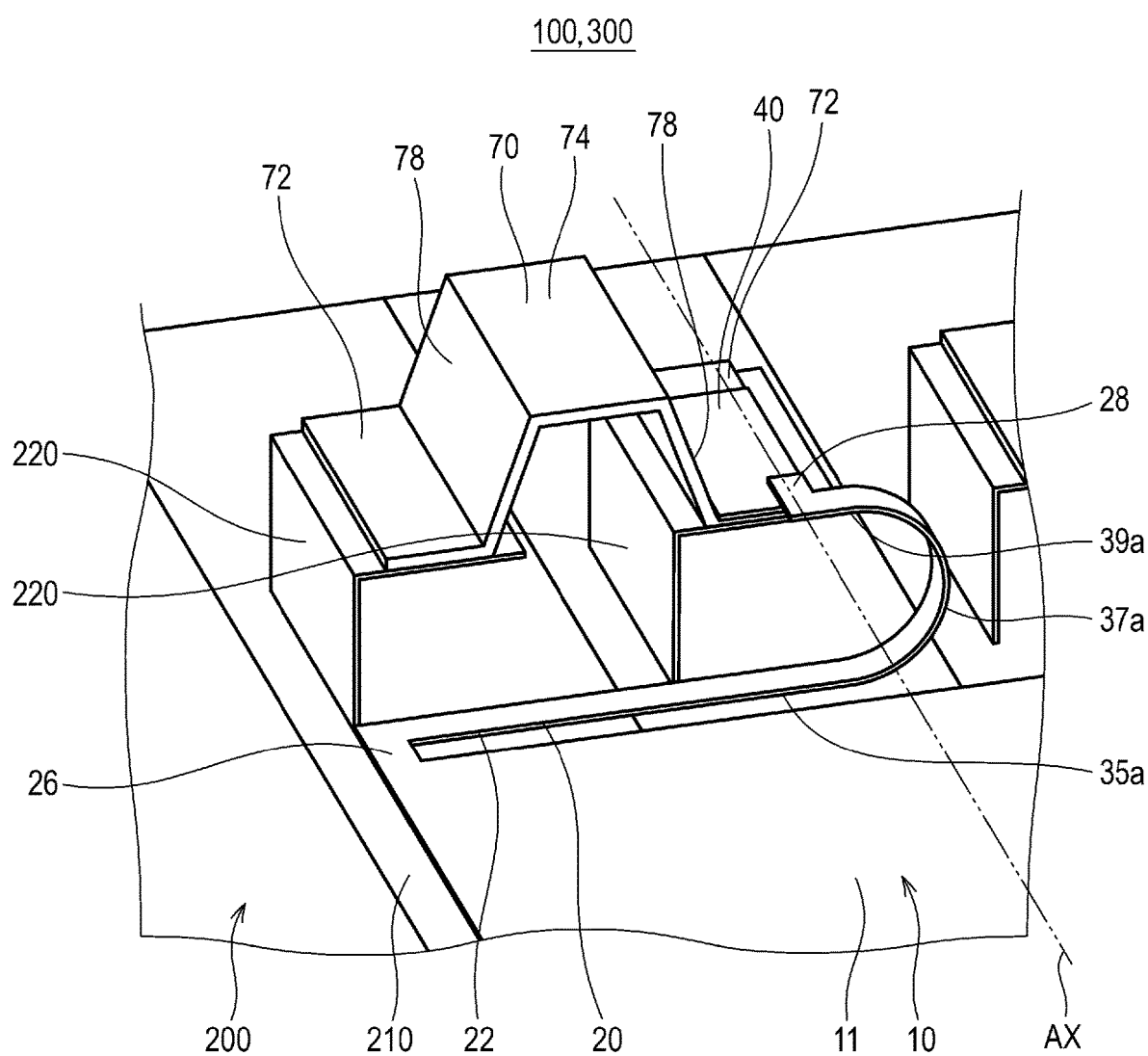
FIG. 21 is a partial enlarged perspective view of a busbar and a peripheral structure thereof in a twelfth embodiment.

Next, a twelfth embodiment is described with reference to FIG. 21. Note that FIG. 21 illustrates a close-up of one busbar 70 and a peripheral structure thereof. In FIG. 21, the illustration of the connection terminal 55 and the wire 51 is omitted.

The voltage monitoring module 100 according to the embodiment is different from the voltage monitoring module 100 according to the above eleventh embodiment in a respect described below, and is configured similarly to the voltage monitoring module 100 according to the above eleventh embodiment in the other respects.

In the case of the embodiment, as illustrated in FIG. 21, the branch portion 20 is configured, including the first portion 35a that extends in the first direction, the second portion 37a that stands from the first portion 35a, and the third portion 39a that has the connection terminal 55 and is folded back from the second portion 37a. The connection terminal 55 is connected to the cell terminal 220 in a state where the flat surface where the third portion 39a is present faces the flat surface where the main body 11 is present.

In more detail, for example, the second portion 37a stands upward from the distal end portion of the first portion 35a in an arc form. The third portion 39a is folded back outward approximately 90 degrees from the distal end of the second portion 37a around the axis AX extending in the second direction.

Such a configuration also enables the distal end protruding portion 28 of the branch portion 20 to be excellently connected to the connection terminal 55 placed horizontally.

Note that in the example illustrated in FIG. 21, the welded plate 40 is joined to the outer leg portion 72 of the busbar 70. In terms of this, the welded plate 40 may be joined to, for example, the main portion 74 of the busbar 70.

However, in the embodiment, the second portion 37a may hang down in an arc form from the distal end portion of the first portion 35a. In this configuration, even when the busbar 70 and the cell terminal 220 are placed below the main body 11, the connection terminal 55 can be excellently connected to the cell terminal 220.

Thirteenth Embodiment

Figure 22:
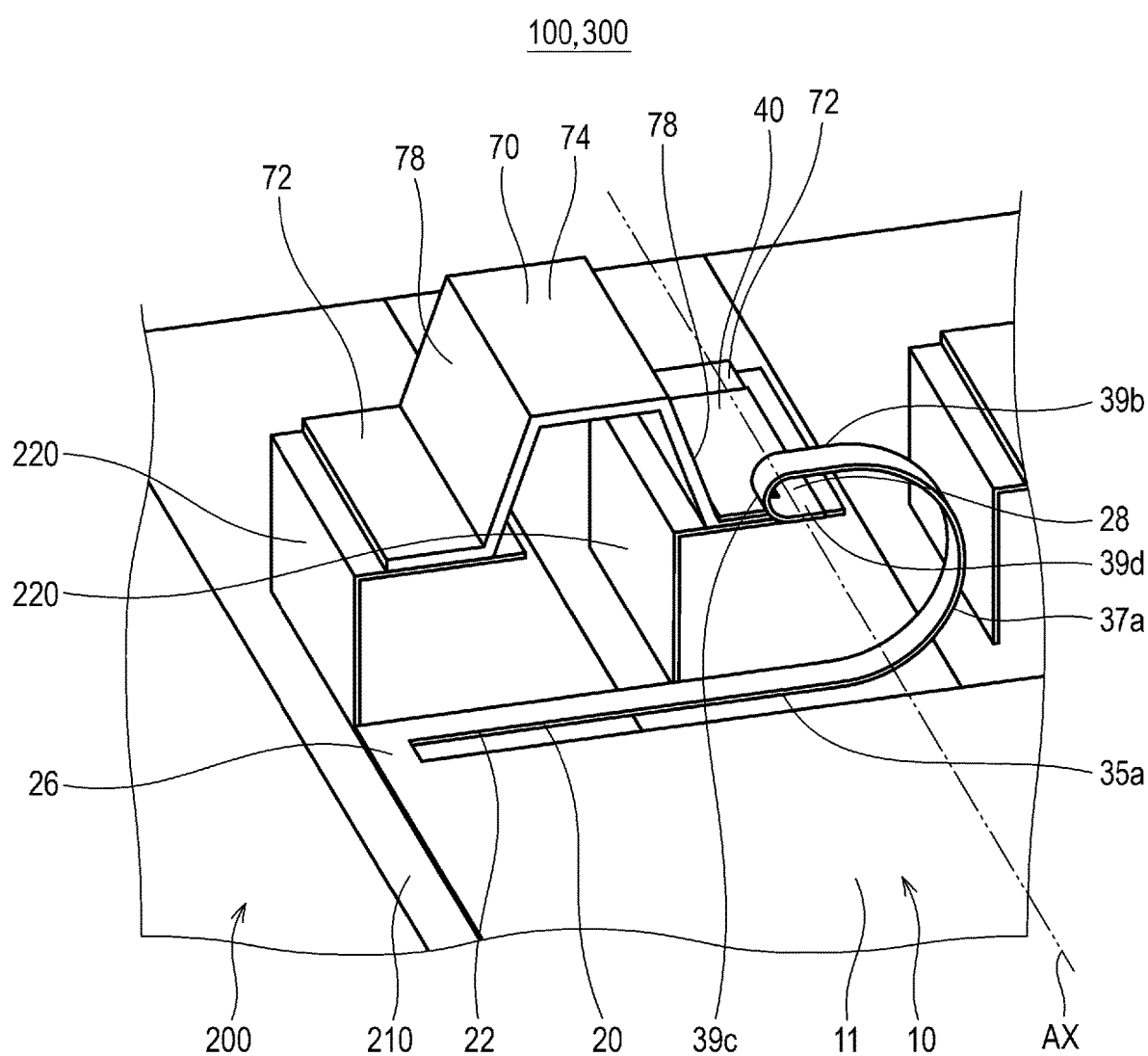
FIG. 22 is a partial enlarged perspective view of a busbar and a peripheral structure thereof in a thirteenth embodiment.

Next, a thirteenth embodiment is described with reference to FIG. 22. Note that FIG. 22 illustrates a close-up of one busbar 70 and a peripheral structure thereof. In FIG. 22, the illustration of the connection terminal 55 and the wire 51 is omitted.

The voltage monitoring module 100 according to the embodiment is different from the voltage monitoring module 100 according to the above eleventh and twelfth embodiments in a respect described below, and is configured similarly to the voltage monitoring module 100 according to the above eleventh and twelfth embodiments in the other respects.

In the case of the embodiment, as illustrated in FIG. 22, the branch portion 20 is configured, including the first portion 35a that extends in the first direction, the second portion 37a that stands from the first portion 35a, the third portion 39b that is folded back from the second portion 37a, a fourth portion 39c that hangs down from the third portion 39b, and a fifth portion 39d that has the connection terminal 55 and is folded back from the fourth portion 39c. The connection terminal 55 is connected to the cell terminal 220 in a state where the flat surface where the third portion 39b is present faces the flat surface where the main body 11 is present and in a state where a portion of a flat surface where the second portion 37a is present faces a flat surface where the fourth portion 39c is present.

In more detail, for example, the second portion 37a stands upward from the distal end portion of the first portion 35a in an arc form. The third portion 39b is folded back outward approximately 90 degrees from the distal end of the second portion 37a around the axis AX extending in the second direction. Furthermore, the fourth portion 39c hangs down in an arc form from a distal end portion of the third portion 39b. The fifth portion 39d is folded back inward approximately 90 degrees from a distal end of the fourth portion 39c around the axis AX extending in the second direction.

Such a configuration also enables the distal end protruding portion 28 of the branch portion 20 to be excellently connected to the connection terminal 55 placed horizontally.

However, in the embodiment, the second portion 37a may hang down in an arc form from the distal end portion of the first portion 35a. In this case, for example, the fourth portion 39c stands upward from the distal end portion of the third portion 39b in an arc form. In this configuration, even when the busbar 70 and the cell terminal 220 are placed below the main body 11, the connection terminal 55 can be excellently connected to the cell terminal 220.

Fourteenth Embodiment

Figure 23:
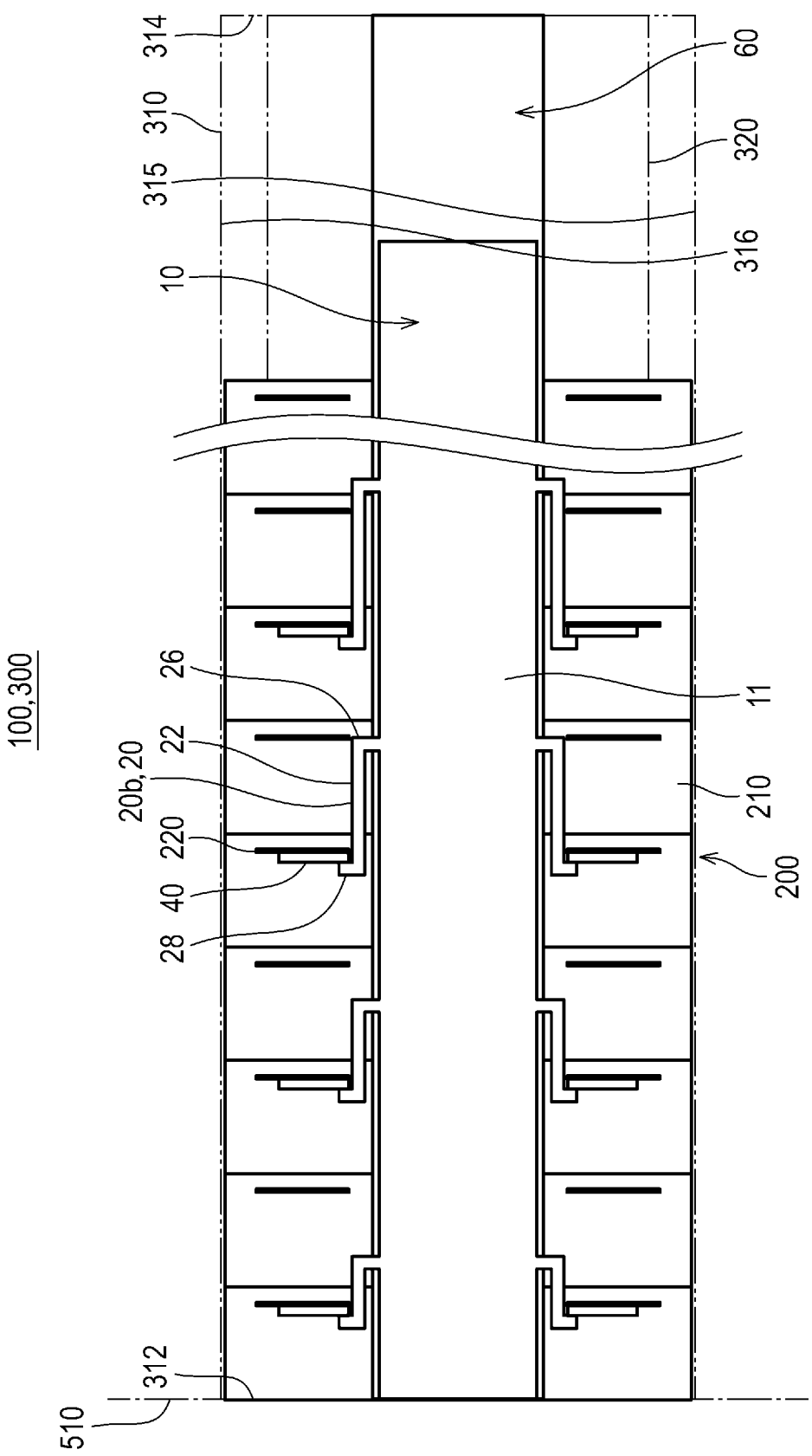
FIG. 23 is a plan view of a battery unit according to a fourteenth embodiment.

Next, a fourteenth embodiment is described with reference to FIG. 23. Note that in FIG. 23, the illustration of the wires 51 and the busbars 70 is omitted. Moreover, in FIG. 23, the housing 310 and the buffer materials 320 are illustrated by chain double-dashed lines.

The voltage monitoring module 100 according to the embodiment is different from the voltage monitoring module 100 according to the above first to thirteenth embodiments in a respect described below, and is configured similarly to the voltage monitoring module 100 according to the above first to thirteenth embodiments in the other respects.

In the example described in the above first embodiment, the reference position 510 is the center of the battery pack 200 in the first direction. In terms of this, as illustrated in FIG. 23, the reference position 510 may be one end of the battery pack 200 in the first direction as in the embodiment.

In this case, the battery cells 210 contract accompanied by the discharge of the battery pack 200, so that the cell terminals 220 move from the other end side toward the one end side (the right to the left in the case of the embodiment) of the battery pack 200.

On the other hand, the battery cells 210 expand accompanied by the charge of the battery pack 200, so that the cell terminals 220 move from the one end side toward the other end side (the left to the right in the case of the embodiment) of the battery pack 200.

Such a configuration also enables the connection terminals 55 to excellently follow the movement of the cell terminals 220 accompanied by the contraction or expansion of the battery cells 210.

Note that in the case of the embodiment, the buffer materials 320 may be placed only on a side opposite to the reference position 510 in the first direction relative to the battery pack 200.

Fifteenth Embodiment

Next, a fifteenth embodiment is described with reference to FIG. 24. Note that in FIG. 24, the housing 310 and the buffer materials 320 are illustrated by chain double-dashed lines.

The voltage monitoring module 100 according to the embodiment is different from the voltage monitoring module 100 according to the above first to fourteenth embodiments in a respect described below, and is configured similarly to the voltage monitoring module 100 according to the above first to fourteenth embodiments in the other respects.

Figure 24:
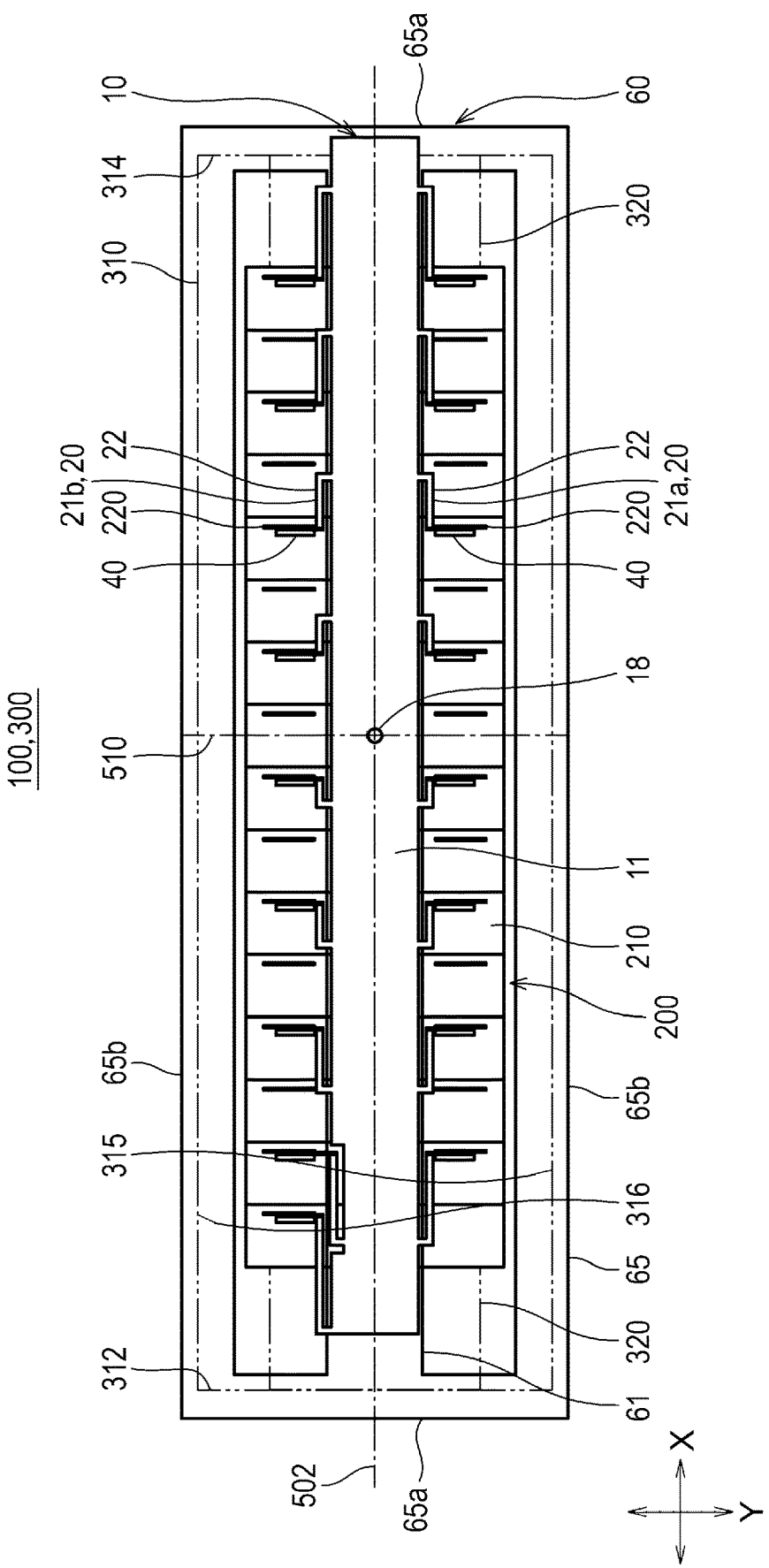
FIG. 24 is a plan view of a battery unit according to a fifteenth embodiment.

In the case of the embodiment, as illustrated in FIG. 24, the plate-shaped member 60 includes, for example, the main portion 61 on which the main body 11 is placed, and a frame-shaped portion 65 that surrounds the perimeter of the main portion 61.

For example, the frame-shaped portion 65 is formed in an approximately rectangular annular shape that is extra long in the first direction in plan view, and includes a pair of left and right short-side portions 65a and a pair of front and back long-side portions 65b. The pair of left and right short-side portions 65a extends in the second direction, parallel to each other. The pair of front and back long-side portions 65b extends in the first direction, parallel to each other.

The length dimension of the frame-shaped portion 65 is, for example, slightly greater in the first direction than the length dimension of the housing 310. For example, two end portions of the frame-shaped portion 65 jut out in the first direction from the housing 31.

For example, the main portion 61 extends linearly in the first direction all the way from the left short-side portion 65a to the right short-side portion 65a. Moreover, the main portion 61 is placed, for example, in a central portion of the frame-shaped portion 65 in the second direction.

In the case of the embodiment, the main body 11 is placed on the top surface of the main portion 61. Moreover, the entire flexible printed board 10 including the branch portions 20 fits within an inner peripheral edge of the frame-shaped portion 65 in plan view.

Moreover, in the case of the embodiment, as an example, the plate-shaped member 60 is fixed to, for example, the front wall portion 315 and the back wall portion 316 of the housing 310. In more detail, the front long-side portion 65b is fixed to an upper end of a central portion (a central portion in the longitudinal direction) of the front wall portion 315. The back long-side portion 65b is fixed to an upper end of a central portion (the same as above) of the back wall portion 316. In this case, in the first direction, two ends of the main body 11 may be terminated inward of the pair of left and right side wall portions 312 and 314 of the housing 310, or may be terminated outward of the side wall portions 312 and 314, respectively.

In this manner, in the embodiment, the termination position of the plate-shaped member 60 in the first direction may be outside or inside the housing 310. Moreover, one end of the plate-shaped member 60 may be terminated outside the housing 310, whereas the other end of the plate-shaped member 60 may be terminated inside the housing 310. Moreover, as in the above first embodiment, in the first direction, the one end of the plate-shaped member 60 may be terminated at substantially the same position as one end (the left side wall portion 312) of the housing 310 and the other end of the plate-shaped member 60 may be terminated at substantially the same position as the other end (the right side wall portion 314) of the housing 310.

Up to this point the embodiments have been described with reference to the drawings. They are illustrative of the aspects of the present disclosure, and various configurations other than the above ones can also be adopted.

For example, in the above examples, the cell terminals 220 are formed in a flat shape. In terms of this, in an aspect of the present disclosure, the shape of the cell terminals 220 is not limited to this example, and may be formed in, for example, a cylindrical shape.

The embodiments include the following technical ideas:
(1) A voltage monitoring module including a flexible printed board including a plurality of wires, in which:
the flexible printed board includes: a main body extending in a first direction; and a plurality of branch portions each branching off the main body, the plurality of branch portions being placed intermittently in the first direction, each of the branch portions includes, at a part on a distal end side thereof, a connection terminal to be connected to a cell terminal being a terminal of a battery cell of a battery pack having a plurality of the stacked battery cells, and among the plurality of branch portions, the branch portion located farther in the first direction from a reference position has a longer length dimension from a proximal end of the branch portion to the connection terminal.

(2) The voltage monitoring module according to (1), in which: the each of the branch portions includes a first-direction extension portion extending in the first direction, and among the plurality of branch portions, the branch portion located farther in the first direction from the reference position has a longer length dimension of the first-direction extension portion.

(3) The voltage monitoring module according to (1) or (2), in which: the plurality of branch portions includes an offset branch portion that is offset to another branch portion in a second direction orthogonal to both of a normal direction of the main body and the first direction, and the offset branch portion and the another branch portion overlap partly as viewed in the second direction.

(4) The voltage monitoring module according to any one of (1) to (3), in which a portion of a part of the plurality of branch portions stays within a rectangle that circumscribes the main body in plan view.

(5) The voltage monitoring module according to any one of (1) to (4), in which a portion of the main body is a main body meandering portion that extends, meandering, in the first direction.

(6) The voltage monitoring module according to any one of (1) to (5), in which a portion of the main body is a curved portion that curves in a direction perpendicular to another portion of the main body.

(7) The voltage monitoring module according to (2), in which: the each of the branch portions includes: a protruding portion protruding from the main body in a second direction orthogonal to both of a normal direction of the main body and the first direction; the first-direction extension portion extending in the first direction from a distal end portion of the protruding portion; and a distal end protruding portion protruding in the second direction from a distal end portion of the first-direction extension portion, and the distal end protruding portion includes the connection terminal.

(8) The voltage monitoring module according to (2), in which: the branch portion located at one end in the first direction includes: a protruding portion protruding in the first direction from one end of the main body in the first direction; a primary extension portion extending from a distal end portion of the protruding portion in a second direction orthogonal to both of a normal direction of the main body and the first direction; the first-direction extension portion extending from a distal end portion of the primary extension portion in a direction opposite to the direction in which the protruding portion protrudes; and a distal end protruding portion protruding in the second direction from a distal end portion of the first-direction extension portion, and the distal end protruding portion includes the connection terminal.

(9) The voltage monitoring module according to (2), in which: the branch portion located at one end in the first direction includes: a protruding portion protruding from the main body in a second direction orthogonal to both of a normal direction of the main body and the first direction; a primary extension portion extending in the first direction from a distal end portion of the protruding portion beyond one end of the main body in the first direction; a secondary extension portion extending in a direction opposite to the direction in which the protruding portion protrudes, from a distal end portion of the primary extension portion beyond an edge of the main body in the second direction; the first-direction extension portion extending from a distal end portion of the secondary extension portion in a direction opposite to the direction in which the primary extension portion extends; and a distal end protruding portion protruding from a distal end portion of the first-direction extension portion in a direction opposite to the direction in which the primary extension portion protrudes, and the distal end protruding portion includes the connection terminal.

(10) The voltage monitoring module according to (2), in which a portion of the first-direction extension portion is a meandering extension portion that extends, meandering, in the first direction.

(11) The voltage monitoring module according to any one of (1) to (10), further including a rigid plate-shaped member on which the main body is mounted.

(12) The voltage monitoring module according to (11), in which: the main body is placed along one of surfaces of the plate-shaped member, and the plate-shaped member includes an opening portion corresponding to a portion of the main body in the first direction, and the portion of the main body is configured to be capable of curving and protruding through the opening portion upon a dimension of the main body in the first direction decreasing.

(13) A battery unit including: the voltage monitoring module according to any one of (1) to (12); and the battery pack, in which: each of the connection terminals of the flexible printed board is connected to the corresponding cell terminal of the battery pack.

(14) The battery unit according to (13), in which the each of the branch portions is configured, including: a first portion extending in the first direction, the first portion being bent around an axis intersecting both of a normal direction of the main body and the first direction; and a second portion having the connection terminal, the second portion standing from the first portion.

(15) The battery unit according to (14), in which the each of the connection terminals is connected to the corresponding cell terminal in a position orthogonal to the main body.

(16) The battery unit according to (13), in which: the each of the branch portions is configured, including: a first portion extending in the first direction; a second portion standing from the first portion; and a third portion having the connection terminal, the third portion being folded back from the second portion, and the each of the connection terminals is connected to the corresponding cell terminal in a state where a flat surface where the third portion is present faces a flat surface where the main body is present.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A voltage monitoring module comprising a flexible printed board including a plurality of wires, wherein
the flexible printed board includes:
a main body extending in a first direction; and
a plurality of branch portions each branching off the main body, the plurality of branch portions being placed intermittently in the first direction,
each of the branch portions includes, at a part on a distal end side thereof, a connection terminal to be connected to a cell terminal being a terminal of a battery cell of a battery pack having a plurality of the stacked battery cells, and
among the plurality of branch portions, the branch portion located farther in the first direction from a reference position has a longer length dimension from a proximal end of the branch portion to the connection terminal,
wherein the plurality of branch portions includes an offset branch portion that is offset to another branch portion in a second direction orthogonal to both of a normal direction of the main body and the first direction, and
the offset branch portion and the another branch portion are placed on a same side of the main body in the second direction and overlap partly as viewed in the second direction.

2. The voltage monitoring module according to claim 1, wherein
the each of the branch portions includes a first-direction extension portion extending in the first direction, and
among the plurality of branch portions, the branch portion located farther in the first direction from the reference position has a longer length dimension of the first-direction extension portion.

3. The voltage monitoring module according to claim 2, wherein the each of the branch portions includes:
a protruding portion protruding from the main body in a second direction orthogonal to both of a normal direction of the main body and the first direction;
the first-direction extension portion extending in the first direction from a distal end portion of the protruding portion; and
a distal end protruding portion protruding in the second direction from a distal end portion of the first-direction extension portion, and
the distal end protruding portion includes the connection terminal.

4. The voltage monitoring module according to claim 2, wherein the branch portion located at one end in the first direction includes:
a protruding portion protruding in the first direction from one end of the main body in the first direction;
a primary extension portion extending from a distal end portion of the protruding portion in a second direction orthogonal to both of a normal direction of the main body and the first direction;
the first-direction extension portion extending from a distal end portion of the primary extension portion in a direction opposite to the direction in which the protruding portion protrudes; and a distal end protruding portion protruding in the second direction from a distal end portion of the first-direction extension portion, and
the distal end protruding portion includes the connection terminal.

5. The voltage monitoring module according to claim 2, wherein the branch portion located at one end in the first direction includes:
a protruding portion protruding from the main body in a second direction orthogonal to both of a normal direction of the main body and the first direction;
a primary extension portion extending in the first direction from a distal end portion of the protruding portion beyond one end of the main body in the first direction;
a secondary extension portion extending in a direction opposite to the direction in which the protruding portion protrudes, from a distal end portion of the primary extension portion beyond an edge of the main body in the second direction;
the first-direction extension portion extending from a distal end portion of the secondary extension portion in a direction opposite to the direction in which the primary extension portion extends; and
a distal end protruding portion protruding from a distal end portion of the first-direction extension portion in a direction opposite to the direction in which the primary extension portion protrudes, and
the distal end protruding portion includes the connection terminal.

6. The voltage monitoring module according to claim 2, wherein a portion of the first-direction extension portion is a meandering extension portion that extends, meandering, in the first direction.

7. The voltage monitoring module according to claim 1, wherein a portion of a part of the plurality of branch portions stays within a rectangle that circumscribes the main body in plan view.

8. The voltage monitoring module according to claim 1, wherein a portion of the main body is a main body meandering portion that extends, meandering, in the first direction.

9. The voltage monitoring module according to claim 1, wherein a portion of the main body is a curved portion that curves in a direction perpendicular to another portion of the main body.

10. The voltage monitoring module according to claim 1, further comprising a rigid plate-shaped member on which the main body is mounted.

11. The voltage monitoring module according to claim 10, wherein
the main body is placed along one of surfaces of the plate-shaped member, and the plate-shaped member includes an opening portion corresponding to a portion of the main body in the first direction, and
the portion of the main body is configured to be capable of curving and protruding through the opening portion upon a dimension of the main body in the first direction decreasing.

12. A battery unit comprising:
the voltage monitoring module according to claim 1; and
the battery pack, wherein
each of the connection terminals of the flexible printed board is connected to the corresponding cell terminal of the battery pack.

13. The battery unit according to claim 12, wherein the each of the branch portions is configured, including:

a first portion extending in the first direction, the first portion being bent around an axis intersecting both of a normal direction of the main body and the first direction; and a second portion having the connection terminal, the second portion standing from the first portion.

14. The battery unit according to claim 13, wherein the each of the connection terminals is connected to the corresponding cell terminal in a position orthogonal to the main body.

15. The battery unit according to claim 12, wherein the each of the branch portions is configured, including:

a first portion extending in the first direction;

a second portion standing from the first portion; and a third portion having the connection terminal, the third portion being folded back from the second portion, and the each of the connection terminals is connected to the corresponding cell terminal in a state where a flat surface where the third portion is present faces a flat surface where the main body is present.

* * * * *